United States Patent
Goyal et al.

(10) Patent No.: US 9,961,435 B1
(45) Date of Patent: May 1, 2018

(54) SMART EARPHONES

(71) Applicant: Amazon Technologies, Inc., Seattle, WA (US)

(72) Inventors: Dushyant Goyal, Seattle, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 42 days.

(21) Appl. No.: 14/965,656

(22) Filed: Dec. 10, 2015

(51) Int. Cl.
*H04R 1/10* (2006.01)
*G10L 21/0272* (2013.01)
*G10L 21/0208* (2013.01)
*G10L 25/84* (2013.01)

(52) U.S. Cl.
CPC ........ *H04R 1/1083* (2013.01); *G10L 21/0208* (2013.01); *G10L 21/0272* (2013.01); *G10L 25/84* (2013.01); *H04R 1/1041* (2013.01); *H04R 2201/107* (2013.01); *H04R 2460/01* (2013.01)

(58) Field of Classification Search
CPC ............... H04R 1/1083; H04R 1/1041; H04R 2201/107; H04R 2460/01; G10L 21/0208; G10L 21/0272; G10L 25/84
See application file for complete search history.

(56) References Cited

U.S. PATENT DOCUMENTS

| | | | |
|---|---|---|---|
| 5,812,659 A | 9/1998 | Mauney et al. | |
| 7,068,798 B2 | 6/2006 | Hugas et al. | |
| 8,468,023 B1 * | 6/2013 | Stracke, Jr. | G06F 3/167 455/569.1 |
| 8,504,360 B2 | 8/2013 | Pedersen | |
| 9,031,250 B2 | 5/2015 | Ookuri et al. | |
| 2003/0118197 A1 * | 6/2003 | Nagayasu | H04B 1/385 381/74 |
| 2004/0002858 A1 | 1/2004 | Attias et al. | |
| 2006/0083387 A1 * | 4/2006 | Emoto | H04R 1/1083 381/73.1 |
| 2008/0243504 A1 | 10/2008 | Poi | |
| 2010/0226505 A1 | 9/2010 | Kimura | |
| 2011/0046948 A1 | 2/2011 | Pedersen | |
| 2011/0145000 A1 | 6/2011 | Hoepken et al. | |
| 2012/0308022 A1 | 12/2012 | Ookuri et al. | |
| 2013/0345842 A1 | 12/2013 | Karakaya et al. | |
| 2014/0064511 A1 | 3/2014 | Desai | |
| 2014/0081631 A1 | 3/2014 | Zhu et al. | |

(Continued)

*Primary Examiner* — Jason R Kurr
(74) *Attorney, Agent, or Firm* — Athorus, PLLC

(57) ABSTRACT

A set of earphones or other wearable or portable audio equipment may be configured to play relevant sound signals from a speaker provided within a cavity mounted about an ear of a user. The earphones may include one or more microphones for capturing acoustic energy within a vicinity of the earphones, or may be in communication with one or more external microphones. Where one or more of the microphones captures acoustic energy that includes a plurality of sound signals, the signals may be processed to identify one of the signals that is relevant to the user. The relevant signal may be reconstructed and amplified from the speaker, and all other signals may be ignored or attenuated. The signals may be further processed to determine any additional information regarding sources of the signals, including whether such signals are within a vicinity of the user, or may pose a risk to the user.

23 Claims, 17 Drawing Sheets

(56) References Cited

U.S. PATENT DOCUMENTS

| | | | |
|---|---|---|---|
| 2015/0055784 A1* | 2/2015 | Brayton | H04R 5/033 |
| | | | 381/56 |
| 2015/0195646 A1 | 7/2015 | Kumar et al. | |
| 2015/0382138 A1* | 12/2015 | Bose | H04L 51/10 |
| | | | 455/456.3 |

* cited by examiner

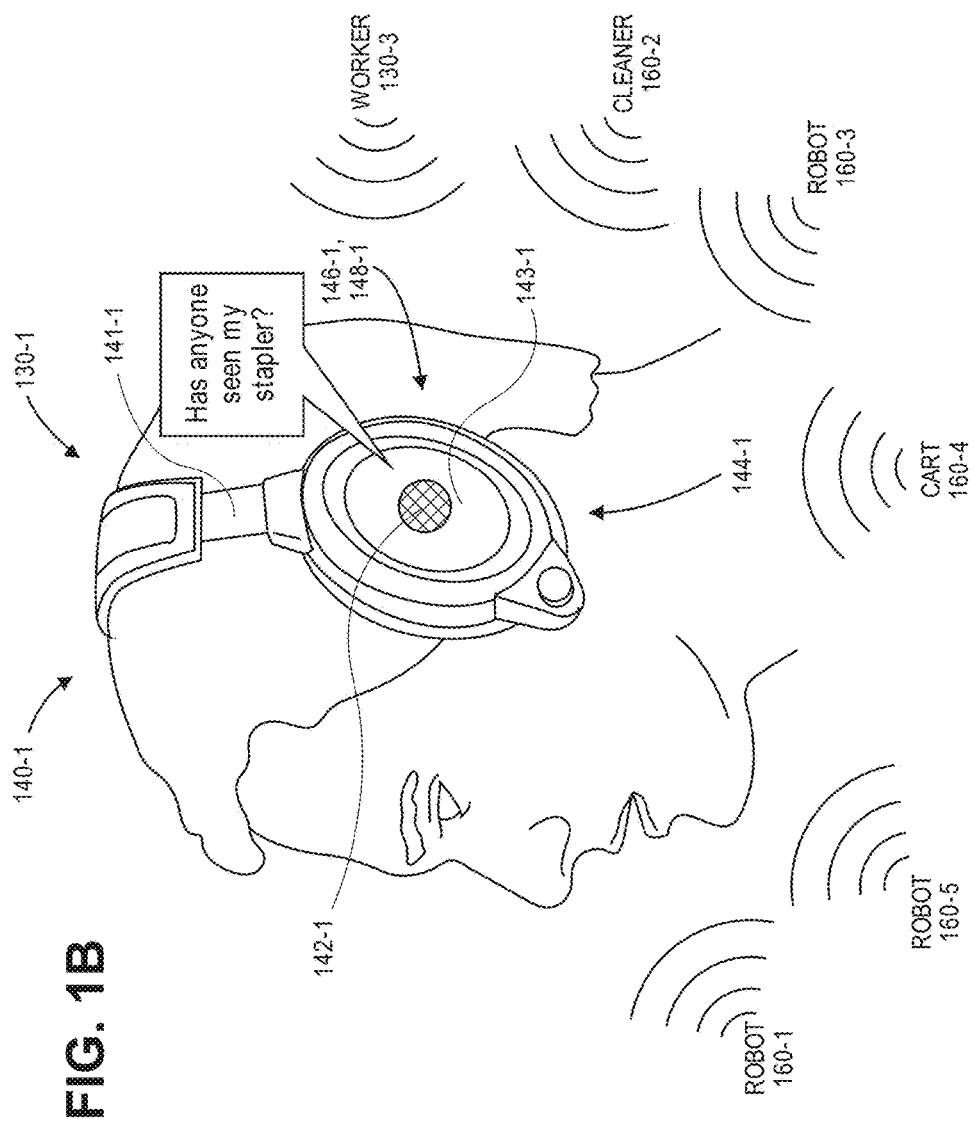

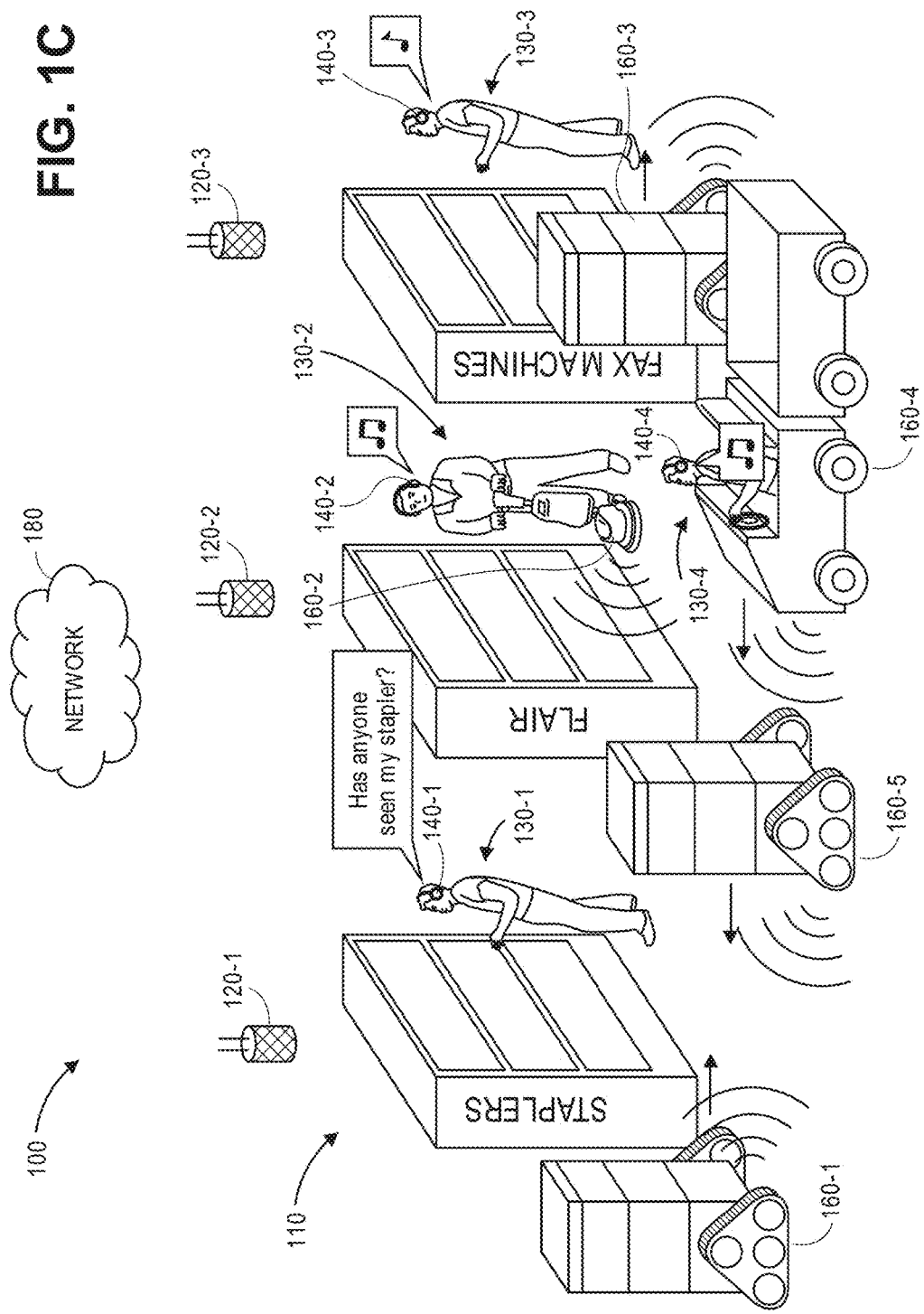

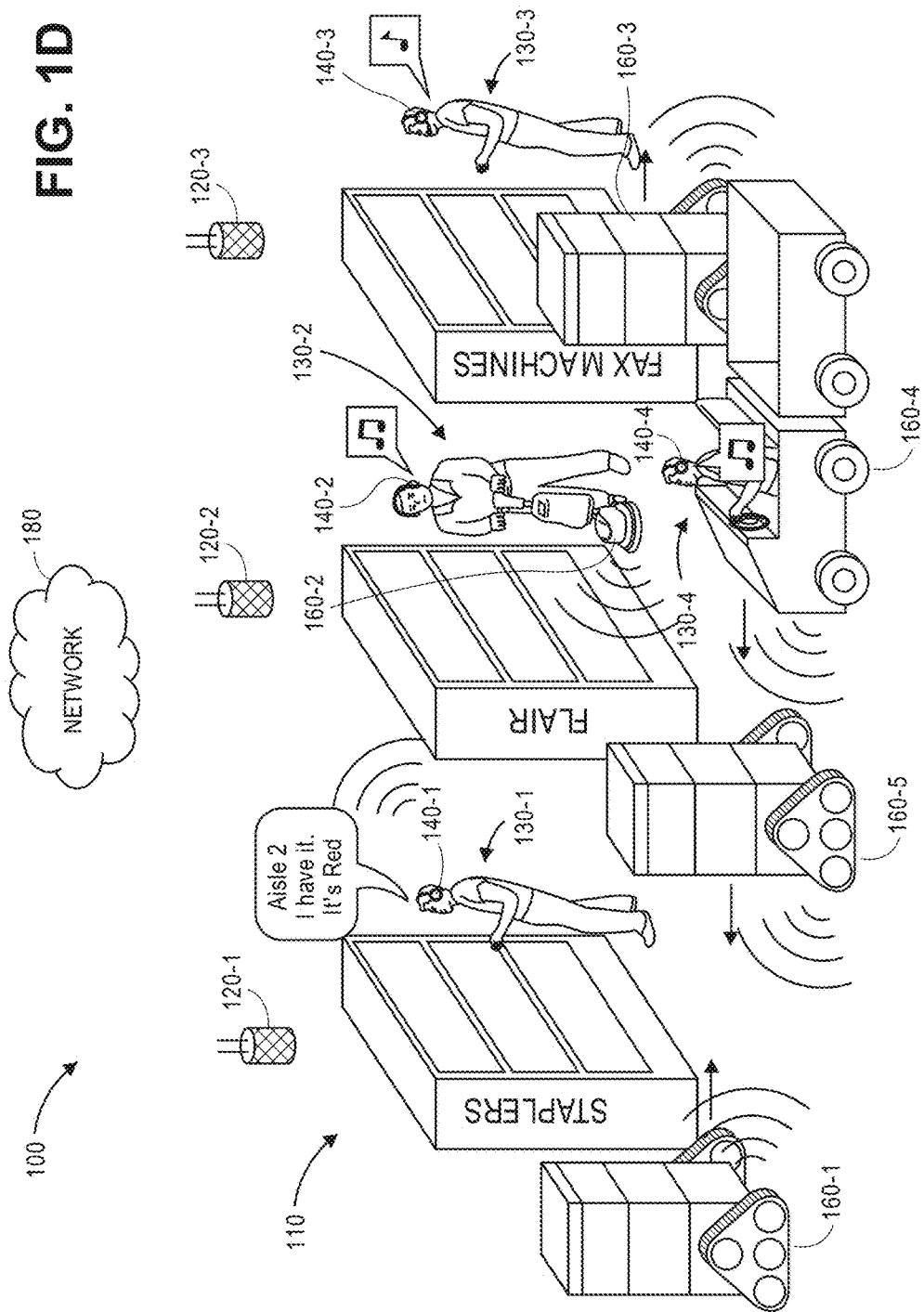

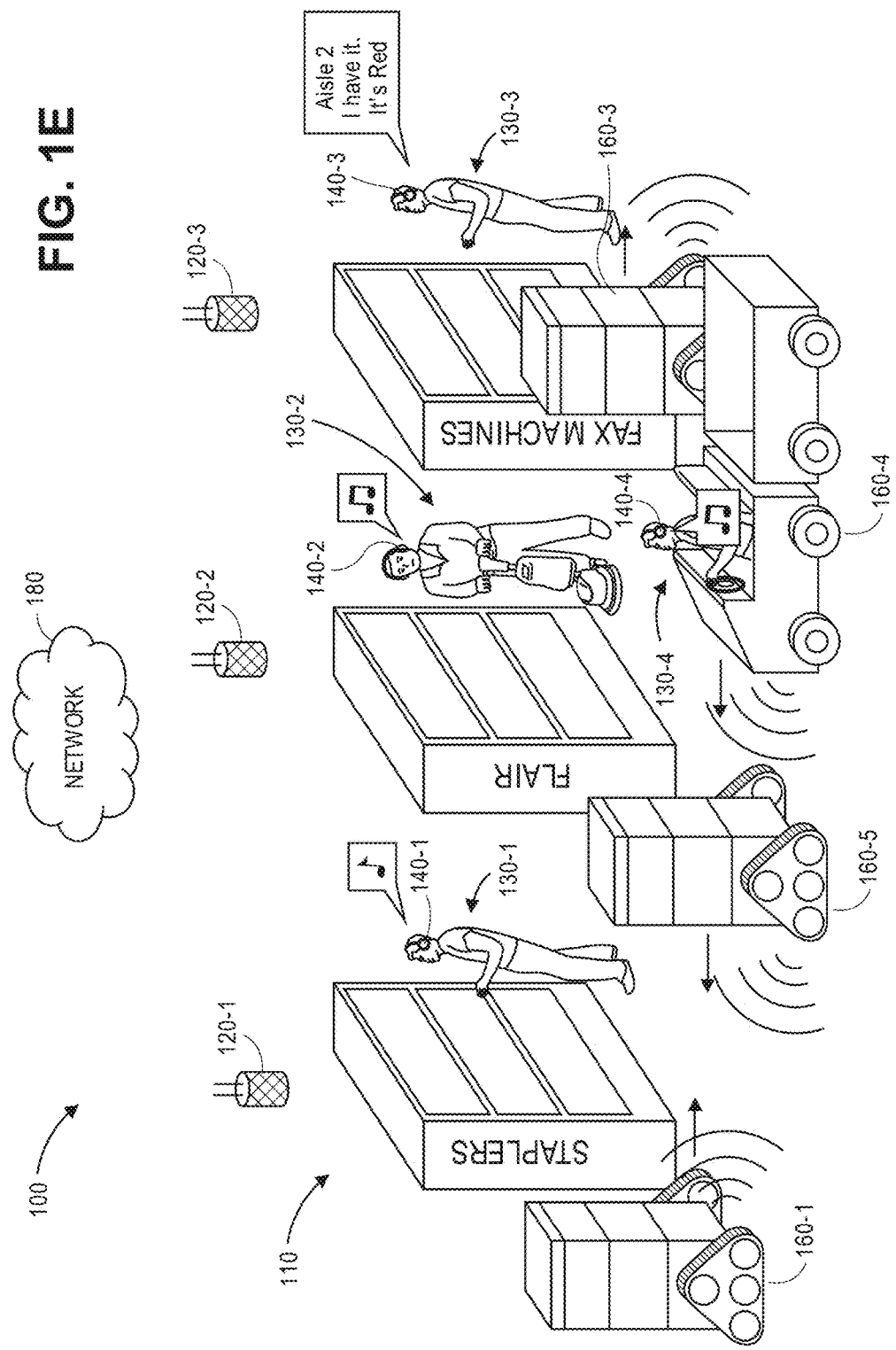

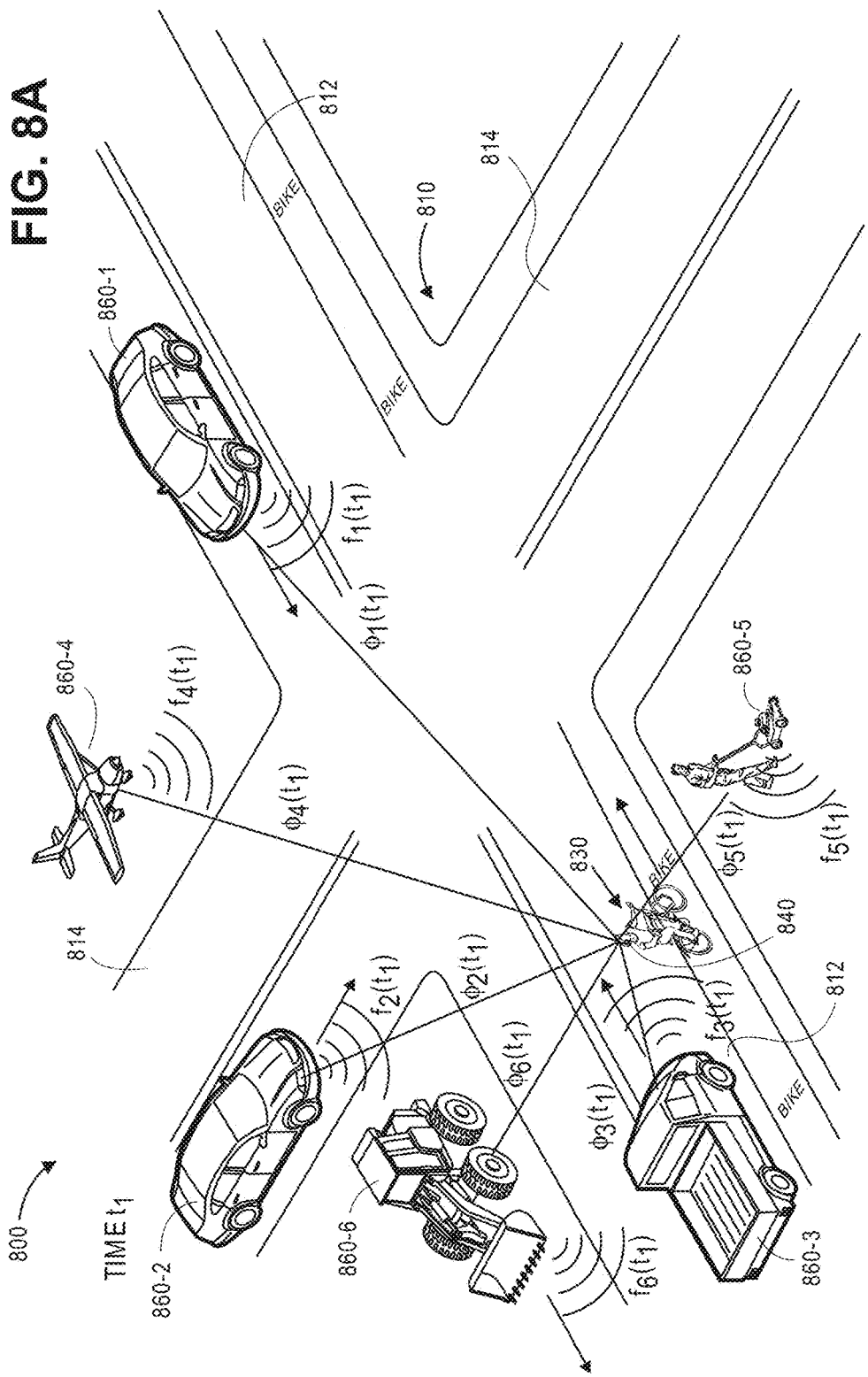

SMART EARPHONES

BACKGROUND

Ear protection devices such as ear plugs or earphones (sometimes called "headphones" or "ear muffs") are commonly worn by individuals who live, work or play in high-noise environments. For example, an operator of stationary or mobile powered equipment (e.g., bulldozers, jackhammers, snowblowers or compressors) having motors or engines may wear ear plugs that may be inserted into an inner ear, in whole or in part, or earphones defining circumaural chambers that encompass all or portions of an outer ear. Such plugs may be formed from foam, rubber or other sound-blocking or sound-absorbing materials that block or attenuate sound waves and reduces the sound pressure levels (or intensities) of such waves which ultimately enter the operator's ear. Likewise, earphones may be constructed with one or more layers of sound-blocking or sound-absorbing materials.

Recently, a number of technological advances have been incorporated into modern ear protection devices. For example, ear plugs or earphones may include one or more miniature speakers that enable sounds to be played at low volumes, and in close proximity, to the inner ear or the outer ear, by a media player or other like device. Thus, some ear plugs or ear phones may be used to passively block or attenuate unwanted sounds within a vicinity of a user while reproducing or broadcasting wanted sounds to the user. Additionally, some ear plugs and earphones are now equipped with noise-cancelling technologies that may actively reduce or minimize the sound pressure levels and/or frequencies of noises that enter a user's ears. For example, noise-cancelling earphones may include one or more ear chambers having microphones for capturing information or data regarding external narrowband noises, computer components that determine intensities and/or frequencies of the noises, and speakers that emit "anti-noise," or cancelling signals that are substantially equal in intensity to the noises and perfectly out-of-phase (e.g., one hundred eighty degrees out-of-phase, or of reverse polarity), in order to effectively address or cancel the noises.

Despite their ability to actively or passively reduce or cancel unwanted narrowband noise, noise-cancellation devices such as ear plugs or earphones have a number of inherent limitations. For example, an active noise-cancellation device is unable to distinguish between sound signals based on their content. Such devices merely detect and characterize noises in terms of their sound pressure levels and frequencies, and treat all active or ambient noises identically, e.g., by generating and emitting anti-noises that are intended to reduce the effects of such noises, or cancel the effects of such noises entirely. Because noise-cancellation devices act without regard to contents of sound signals, however, such devices block out all conversational speech, all alarms or notifications, or all machinery sounds, and are unable to identify relevant speech, relevant alarms or relevant machinery sounds, or to allow any relevant sounds to pass therethrough to a user. As a result, in audibly cluttered environments, workers who must be able to engage in conversation or listen for alarms, notifications or sounds emitted by machinery sometimes forego the use of any ear protection devices, thereby subjecting themselves to increased risks of ear damage or hearing loss.

BRIEF DESCRIPTION OF THE DRAWINGS

FIGS. 1A through 1E are views of aspects of one system for recognizing and emitting semantically relevant sounds in accordance with embodiments of the present disclosure.

FIGS. 8A through 8E are views of aspects of one system for recognizing and emitting semantically relevant sounds in accordance with embodiments of the present disclosure.

DETAILED DESCRIPTION

As is set forth in greater detail below, the present disclosure is directed to recognizing and emitting semantically relevant sounds. More specifically, the systems and methods disclosed herein are directed to capturing a variety of information or data regarding acoustic energies that are emitted or radiated in a monitored space, and evaluating characteristics of the acoustic energies to determine which, if any, of such energies correspond to sounds that are semantically relevant to one or more individuals or machines within the monitored space or elsewhere. If any of the captured acoustic energies correspond to a semantically relevant sound, one or more signals for generating the sound may be fed to a selected speaker or other sound emitting device, where the sound may be reconstructed and reproduced within a vicinity of the individuals or machines for which the sound is semantically relevant, and at a sound pressure level that allows such individuals or machines to recognize and understand the semantically relevant sound. In some embodiments, wearable or mobile computer devices such as headsets or earphones may be configured with ear chambers defining cavities having sound sensors mounted external to such cavities, and sound speakers provided within such cavities, such that the sound sensors may capture information or data regarding acoustic energies radiated outside of the cavities within a vicinity of the headsets or earphones, and the sound speakers may reconstruct and reproduce semantically relevant sounds within the ear chambers, thereby enabling users of the wearable or mobile computer devices to hear the semantically relevant sounds while filtering out sounds that are not semantically relevant to such users.

Figure 1A:
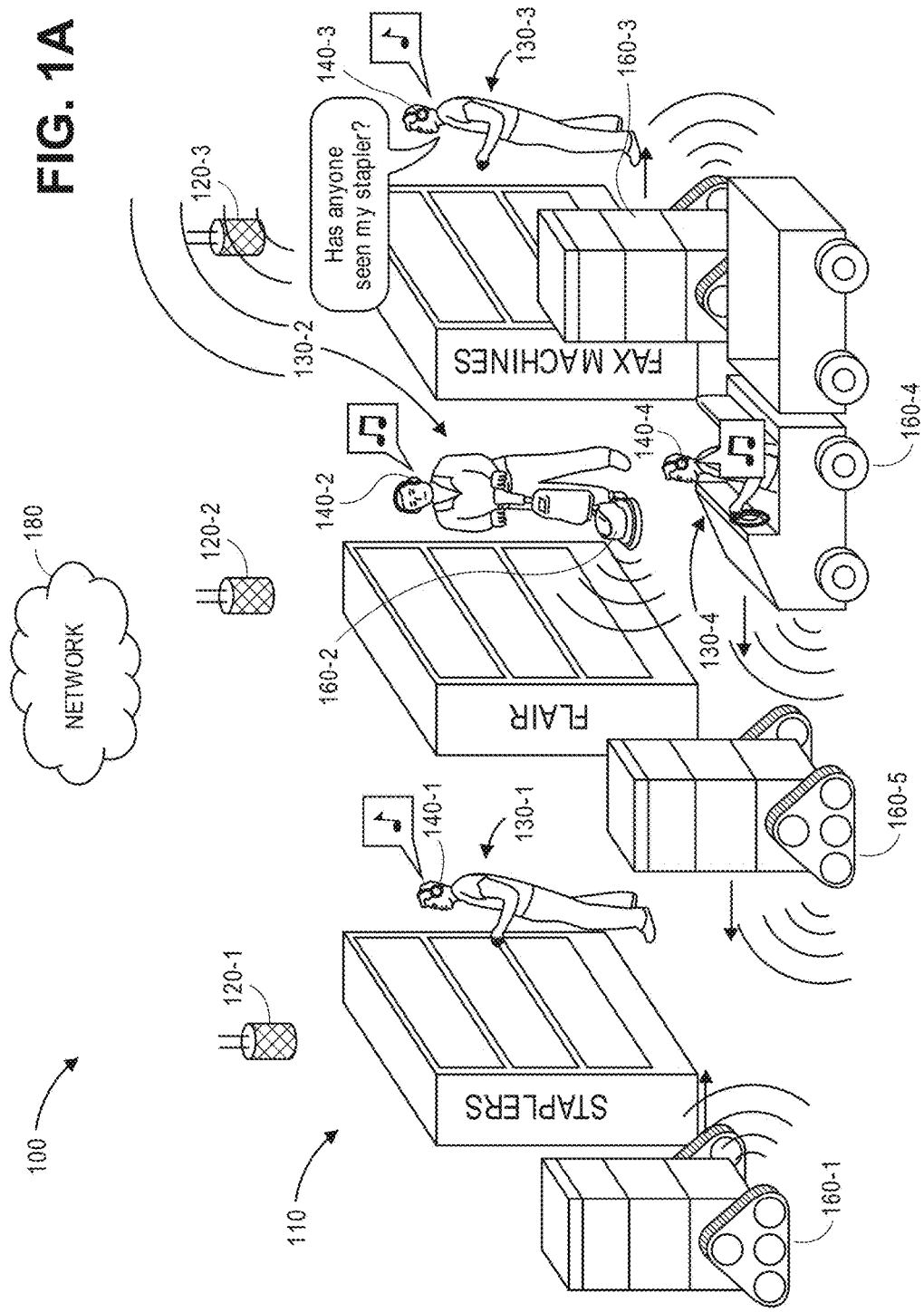

Referring to FIGS. 1A through 1E, a system 100 for recognizing and emitting semantically relevant sounds in accordance with the present disclosure is shown. The system 100 includes a monitored space 110 having a plurality of microphones 120-1, 120-2, 120-3 mounted therein. For example, the monitored space 110 may be a working environment such as a fulfillment center, a warehouse, or other like facility; a financial institution, such as a bank or trading floor; a transportation hub, such as an airport, a train station or a bus station; or a stadium, a theater, a shopping center or another large-scale venue; or portions thereof. As is shown in FIG. 1A, the system 100 also includes a plurality of workers 130-1, 130-2, 130-3, 130-4 within the monitored space 110. Each of the workers 130-1, 130-2, 130-3, 130-4 is wearing a set of earphones 140-1, 140-2, 140-3, 140-4 or another wearable or portable computer device. The microphones 120-1, 120-2, 120-3 and/or the earphones 140-1, 140-2, 140-3, 140-4 may be connected to one another directly or over a network 180 through the sending and receiving of digital data.

As is shown in FIG. 1A, the monitored space 110 also includes a plurality of noise-generating equipment, viz., autonomous mobile robots 160-1, 160-3, 160-5, a cleaning machine 160-2 and a powered cart 160-4, emitting a plurality of sounds having various sound pressure levels (or intensities) and/or frequencies. The monitored space 110 may further include any number of other noise sources (not shown), including but not limited to additional personnel or other animals (e.g., barking dogs or other service animals), or other noise-generating equipment.

The workers 130-1, 130-2, 130-3, 130-4 may be any type or form of personnel within the monitored space 110, including but not limited to pickers, sorters, couriers, maintenance technicians, supervisors, authorities or visitors. Additionally, each of the earphones 140-1, 140-2, 140-3, 140-4 may include one or more speakers provided within one or more ear chambers, e.g., a single chamber to be worn on a single ear of a user, or two chambers to be worn on both ears of the user, as well as one or more microphones provided on external surfaces, e.g., within close proximity of the user's mouth, or also around or about the earphones. For example, as is shown in FIG. 1B, the earphones 140-1 worn by the worker 130-1 include a microphone 142-1 and a speaker 144-1 provided in an ear chamber 143-1 mounted to a frame 141-1. The ear chamber 143-1 encompasses all or a portion of a left ear of the user 130-1. The earphones 140-1 further include a computer processor 146-1 and a transceiver 148-1 for sending signals to or receiving signals from one or more computer devices via the network 180. The computer processor 146-1 may be configured to control the operation of the microphone 142-1, the speaker 144-1 and/or the transceiver 148-1. Moreover, the earphones 140-1, 140-2, 140-3, 140-4 may also be constructed with one or more layers or sections of sound-blocking or sound-absorbing materials (e.g., within the ear chamber 143-1 of the earphones 140-1 shown in FIG. 1B) for blocking or attenuating sound waves generated outside of the ear chamber, e.g., by one or more of the noise-generating equipment 160-1, 160-2, 160-3, 160-4, 160-5. Some such sound-blocking or sound-absorbing materials may include, but are not limited to, one or more porous absorbers such as cell foams (e.g., open-cell or closed-cell foams).

In some embodiments, the ear chambers of the earphones 140-1, 140-2, 140-3, 140-4 within which the speakers are provided may be anechoic in nature. Additionally, in some embodiments, the earphones 140-1, 140-2, 140-3, 140-4 may perform some or all of the functions of a standard digital or portable media player, such as (a device configured to play audio files (e.g., .MP3 or .WMA files), video files (e.g., .WMV or .AVI files) or other multimedia content that may be received over the network 180 or stored thereon. For example, as is shown in FIG. 1A, each of the workers 130-1, 130-2, 130-3, 130-4 is listening to music or other sounds via the earphones 140-1, 140-2, 140-3, 140-4.

In accordance with the present disclosure, a set of earphones or other wearable or portable computer equipment may be configured to identify information regarding one or more semantically relevant audible sounds that are recognized outside of an ear chamber or other component, and to regenerate such sounds within the ear chamber. As is shown in FIGS. 1A and 1B, acoustic energies may be captured by any number of microphones within the monitored space 110, including but not limited to the microphones 120-1, 120-2, 120-3 mounted above the monitored space 110, or microphones provided on the earphones 140-1, 140-2, 140-3, 140-4. For example, as is shown in FIG. 1A and FIG. 1B, acoustic energies including the words "Has anyone seen my stapler?" uttered by the worker 130-3, along with various other sounds being emitted within the monitored space, e.g., the noise-generating equipment 160-1, 160-2, 160-3, 160-4, 160-5, may be captured by the microphone 142-1 provided on the earphones 140-1 worn by the worker 130-1. Information or data regarding the acoustic energies may then be analyzed to decompose such energies into discrete sound signals, e.g., according to one or more algorithms or techniques utilizing a Fourier transformation, such as a cepstrum analysis. Each of the discrete sound signals may be analyzed to determine its semantic content, e.g., through one or more natural language processing (NLP) techniques, or based on their respective sound pressure levels and/or frequencies. Such techniques may be performed using one or more local computing devices, e.g., residing on the earphones 140-1, or in one or more alternate or virtual locations, e.g., in a "cloud"-based environment.

Once the semantic content of the various sound signals has been determined, a measure of the semantic relevance of the sound signals to one or more of the workers 130-1, 130-2, 130-3, 130-4 may be determined, and signals that are determined to be semantically relevant to one or more of the workers 130-1, 130-2, 130-3, 130-4 may be reconstructed and provided to a corresponding one of the earphones 140-1, 140-2, 140-3, 140-4. As is shown in FIG. 1C, in response to the speaking or uttering of the words, "Has anyone seen my stapler?" by the worker 130-3, such words may be captured by the microphone 142-1 provided on the earphones 140-1, and determined to be semantically relevant to worker 130-1, who is located near a row of shelves including a plurality of staplers. A sound signal including such words may be reconstructed by the earphones 140-1 worn by the worker 130-1, and played by one or more speakers 144-1 provided thereon in real time or in near-real time. Alternatively, the earphones 140-1 may be configured to play sounds relating to the words spoken by the worker 130-3, e.g., an alarm or other sound representative of one or more of the words (e.g., where a worker utters the words "fire" or "help," a siren may be played), or sounds including the words spoken by the worker 130-3 in another tone or in another language. Additionally, the earphones 140-1 may be specifically configured to pause the playing of music or other sounds when signals including semantically relevant sounds are received, or may play such music or sounds simultaneously along with the words. Moreover, because the words spoken by the worker 130-3 are not semantically relevant to the workers 130-2, 130-4, neither the words nor any sounds relating to the words are played by the earphones 140-2, 140-4, which may continue to play music or other sounds. Furthermore, in some embodiments, the words may be captured by one or more microphones other than the microphone 142-1, e.g., microphones provided on the earphones 140-2, 140-3, 140-4, or the microphones 120-1, 120-2, 120-3, and determined to be semantically relevant to the worker 130-1. Signals or other information regarding the semantically relevant sounds may be reconstructed and provided to the earphones 140-1, in real time or in near-real time, e.g., over the network 180 or directly, and played to the worker 130-1 by the one or more speakers 144-1.

Likewise, as is shown in FIG. 1D, when the worker 130-1 responds by speaking or uttering the words "Aisle 2. I have it. It's red," acoustic energies including such words may be captured and decomposed to recognize the words therein, e.g., using one or more microphones and/or computer processors provided on the earphones 140-3, or other microphones or computer processors, such as one or more of the microphones 120-1, 120-2, 120-3 or the microphones or processors provided on the earphones 140-1, 140-2, 140-4, and the words may be deemed relevant to the worker 130-3. Subsequently, as is shown in FIG. 1E, a signal including such words may be reconstructed by the earphones 140-3 worn by the worker 130-3, or transmitted to the earphones 140-3, and played by one or more speakers provided thereon.

Accordingly, the present disclosure is directed to capturing and analyzing acoustic energies to recognize one or more sounds included therein as being semantically relevant to one or more individuals or machines. Once a sound has been deemed semantically relevant, the sound may be reconstructed and played from a selected audio speaker, such as a speaker included in wearable or portable audio components such as ear buds or earphones. Sounds may be deemed semantically relevant using one or more machine learning algorithms or techniques, including but not limited to, a semantic model that determines a meaning of sound content based on relevant sound characteristics such as frequencies, intensities, words spoken or speech rates, as well as extrinsic data such as locations, speeds or directions of sources of such sounds. The systems and methods of the present disclosure may thus be used to automatically separate acoustic wheat from acoustic chaff, and to present most relevant sounds to users via a selected speaker while blocking or inhibiting irrelevant or less relevant sounds from the user. In some embodiments, the most relevant sounds may be identified and presented to such users without the use of inter-device communication systems. Instead, the most relevant sounds may be recognized among a plurality of other sounds within an environment by a headset or other wearable or portable computer device associated with a user, determined to be relevant to the user, isolated, reconstructed and played to the user by a selected speaker (e.g., a speaker included within a headset, a set of earphones, an ear bud or other like device, or a speaker located within a predetermined range of the user).

Sound is kinetic energy that is released when motion or vibration of an object results in a pressure change in a medium, such as air, surrounding the object. For example, sound may be generated in response to vibrations resulting from impacts or frictional contact between two or more bodies. Sound may also be generated in response to vibrations resulting from the rotation of one or more bodies such as shafts, e.g., by motors or other prime movers. Sound may be further generated in response to vibrations caused by fluid flow over one or more bodies. In essence, any movement of molecules, or contact between molecules, that causes a vibration may result in the emission of sound at a pressure level or intensity, and at one or more frequencies. When such motion or vibration occurs, the densities of the molecules of the medium within a vicinity of the object are subjected to alternating periods of condensation and rarefaction, resulting in contractions and expansions of such molecules, which causes the issuance of a sound wave that may travel at speeds of approximately three hundred forty-three meters per second (343 m/s) in dry air. The intensity of sounds is commonly determined as a sound pressure level (or sound level), and is measured in logarithmic units called decibels (dB).

In industrial applications, noise is typically generated as either mechanical noise, fluid noise or electromagnetic noise. Mechanical noise typically results when a solid vibrating surface, e.g., a driven surface, or a surface in contact with one or linkages or prime movers, emits sound power that is a function of a density of a medium, the speed of sound within the medium, the vibrating area, the mean square vibrating velocity of the medium to a vibrating area and a mean square vibrating velocity, and the radiation efficiency of the material. Fluid noise generated by turbulent flow is generally proportional to multiple orders of flow velocity, e.g., six to eight powers greater than the velocity of the turbulent flow, while sound power generated by rotating fans is determined according to a function of flow rate and static pressure. In electric motors, noise may be generated due to airflow at inlets and outlets of cooling fans, bearing or casing vibrations, motor balancing shaft misalignment or improper motor mountings.

With regard to a frequency spectrum, emitted sounds generally fall into one of two categories. Sounds having energies that are typically concentrated or centered around discrete frequencies are classified as narrowband noise, or narrowband tonals, and are commonly periodic in nature. Narrowband noise is commonly encountered in many industrial applications. For example, many rotating machines such as internal combustion engines, compressors, vacuum pumps or other rotating machines may inherently vibrate at frequencies associated with their angular velocities, as well as electric power transformers that generate large magnetic fields and thereby vibrate at harmonics of line frequencies. Conversely, sounds having energies that are distributed across bands of frequencies are classified as broadband noise. Additionally, some machines or sound sources may emit sounds that are combinations of narrowband noise and broadband noise, e.g., sounds that have component energy levels that are concentrated about one or more discrete frequencies and also across entire frequency spectra.

Many diverse environments having a plurality of noise generating sources such as machines or people (or other animals) are plagued by substantial amounts of ambient noise or high levels of noise pollution. For example, in an industrial environment, any number of pumps, engines, turbines or other machinery components may emit operational noise (e.g., whirring or grinding of component parts) or one or more audible alarms or indications based on their respective statuses or conditions. Likewise, in a transportation center, large numbers of people may collectively generate and emit sounds while speaking or bustling, and powered vehicles such as buses, trucks or trains may also radiate substantial acoustic energy from operating motors, sirens, loudspeakers or audio/video displays.

Frequently, many of the sounds emitted in a high-volume environment are either undesired, unnecessary or unpleasant to one or more humans therein. For example, in a sporting venue, bar or other boisterous environment, many fans or patrons tend to speak in loud tones or use profanity from time to time. On a trading floor, brokers or other workers often simultaneously shout numerous purchase or sale instructions to other brokers or workers, at high volumes, thereby obscuring any reasonable efforts at successful verbal correspondence. During a public safety crisis, various loud, erratic or conflicting sounds may be generated, and such sounds may severely complicate communications between first responders, or between a first responder and a victim or injured party. In a commercial environment such as a fulfillment center, a warehouse or a like facility, high levels of ambient noise generated by machinery, equipment or personnel may typically force workers to use traditional two-way radio devices (e.g., "walkie-talkies") in order to speak with one another.

High levels of ambient noise or noise pollution may be addressed in any number of ways. For example, a worker may wear a passive ear protection device that is padded with one or more layers of sound-blocking or sound-absorbing materials to protect his or her ears from damage due to excessive levels of noise nearby. An effective passive ear protection device tends to block out all sounds, however, and does not discriminate between important or selected sounds and unwanted or irrelevant noises. Workers may also wear an active ear protection device configured to cancel specific noises that are emitted within an environment. For example, a set of noise-cancelling earphones or headphones may include one or more microphones that sense a specific noise, and one or more transducers that generate and emit a signal of "anti-noise," or noise that is substantially equal in amplitude to a narrowband noise centered around a discrete frequency, and is perfectly out-of-phase (e.g., one hundred eighty degrees out-of-phase, or of reverse polarity), and emitted in association with the narrowband noise, in order to effectively address or cancel the narrowband noise. Like a passive ear protection device, however, active noise-cancelling earphones or headphones do not determine whether any of the noises being cancelled are actually relevant to the user. Likewise, traditional two-way radio devices are typically configured to passively block or attenuate other sound signals generated nearby, however, also without regard to the content of such signals.

The systems and methods of the present disclosure are directed to capturing acoustic energies using one or more microphones or other sound sensors, decomposing such energies into discrete sounds using one or more computer processors, and determining whether any of such sounds are of particular semantic relevance to a given individual (e.g., person or machine). If any of the sounds are deemed semantically relevant, such sounds, or other sound relating to such sounds, may be reconstructed and played via one or more speakers or other sound emitters provided in close proximity to the individual. In a preferred embodiment, a speaker is provided within a chamber configured for mounting about a human ear, e.g., in a set of earphones or headphones, or another wearable or portable apparatus, and a microphone is provided outside of the chamber, e.g., mounted to an external surface of the chamber, or within an environment in which the chamber is worn and used.

According to some embodiments, a microphone or other sound sensor provided outside of a chamber may capture acoustic energies regarding a plurality of sounds. A computer device in communication with the microphone or sound sensor may decompose the acoustic energies into a plurality of discrete sounds. In some embodiments, acoustic energies may be decomposed into one or more constituent parts using a Fourier transformation or decomposition, such as a cepstrum analysis. For example, acoustic energies may be decomposed based on one or more continuous transforms (e.g., Laplace transforms, Mellin transforms, Hartley transforms) or discrete transforms, or any other relevant algorithm or technique for recognizing sounds within acoustic energies based on their respective characteristics. In still other embodiments, the discrete sounds may be processed to identify characteristics of such sounds, including but not limited to frequencies, intensities, words spoken or speech rates, or to determine whether any of the sounds is semantically relevant to one or more individuals based on such characteristics. For example, one or more NLP engines or techniques may evaluate a sound signal and mine any text, words, phrases or phonemes therefrom. Whether the sound signal is relevant to an individual may be determined, at least in part, by comparing such text, words, phrases or phonemes to information that may be known regarding the individual, e.g., attributes, interests or preferences of the individual, which may be included in records of semantic data stored in a database or other data store.

If one or more of a plurality of discrete sounds is deemed to be semantically relevant, the sounds may be reconstructed and reproduced via an audio speaker or like device provided inside of a chamber, or otherwise within earshot or an audible range of one or more persons for whom the sounds are particularly relevant. In one embodiment, a chamber may be provided on a wearable or portable set of earphones or headphones, and configured to receive all or a portion of an ear within, such that a microphone is aligned to capture sounds external to the chamber and an audio speaker is provided within the chamber and in close proximity to the ear. In another embodiment, the chamber may be an occupied space of a vehicle (e.g., an automobile, a train, an airplane, a ship, or any other type of vehicle having one or more occupied spaces), with a microphone aligned to capture sounds external to the occupied space, and an audio speaker provided within the occupied space. Additionally, in yet another embodiment, the chamber may be a plug-like device (e.g., an ear bud) having a speaker configured for insertion into an ear, and the microphone may be provided on an external surface of the device or mounted elsewhere and aligned to capture sounds that are generated external to the ear.

According to some other embodiments, relevance of a sound signal may be determined according to one or more semantic models or other machine learning systems, which may determine which of a plurality of sounds is semantically relevant to one or more users, and rank the semantically relevant sounds in terms of priority to the one or more users. Such systems may classify characteristics of sounds (e.g., frequencies, intensities, words spoken or speech rates) in real time or in near-real time, and in response to environmental events as such events occur. In some embodiments, a semantic model and/or machine learning system may include or rely upon a data store including information regarding sound signals in decomposing acoustic energy into a plurality of sound signals, or in classifying each of the signals and ranking and weighting the classified signals, which may then be reconstituted into a final signal to be reproduced to a person to whom the sounds are particularly relevant.

Semantically relevant sounds and/or sound signals may be classified or weighted in any number of ways. For example, in some embodiments, sounds may be classified or weighted at a high level, with labels describing the sounds, or referring to events which may have caused the sounds, such as "human voice," "nearby rotating machinery," "dropped object," "fire alarm," "approaching vehicle," "forklift" or "pickup truck." In other embodiments, sounds may be classified or weighted with regard to a location and/or vector, e.g., sounds radiating from a source in specific direction or region of interest traveling at a determined velocity or acceleration, and amplified or diminished in a predetermined manner accordingly. Sounds may also be classified or weighted based on Doppler effects, e.g., determined changes in frequency of sounds radiating from a source, which may indicate that the source is approaching, departing or moving in a particular direction, and amplified or diminished in a predetermined manner accordingly. Sounds may further be classified or weighted based on their respective frequency or bands of frequencies, and amplified or diminished in a predetermined manner accordingly. Sounds may also be classified or weighted based at least in part on any words spoken therein, any language associated with such words, any rates at which such words are spoken, or any other characteristics of such words. Any algorithms or techniques for recognizing phonemes, words or patterns within speech, e.g., for recognizing isolated or connected words, or continuous or spontaneous speech, may be utilized in accordance with the present disclosure. For example, in some embodiments, the systems and methods disclosed herein may be configured to recognize speech according to acoustic phonetic approaches, pattern recognition approaches, template-based approaches, stochastic modeling, dynamic time warping, vector quantization, or artificial intelligence or other knowledge-based approaches implemented using one or more machine learning systems.

Any strategies for detecting, recognizing or classifying sounds, e.g., according to one or more machine learning algorithms or techniques, including but not limited to nearest neighbor methods or analyses, artificial neural networks, conditional random fields, factorization methods or techniques, K-means clustering analyses or techniques, similarity measures such as log likelihood similarities or cosine similarities, latent Dirichlet allocations or other topic models, or latent semantic analyses may be utilized in accordance with the present disclosure. Using any of the foregoing algorithms or techniques, or any other algorithms or techniques, a relative association between sounds and individuals may be determined.

In some embodiments, a machine learning system may identify not only a sound pressure level or intensity and a frequency of a given sound, or words spoken or speech rates within the given sound, but also a confidence interval, confidence level or other measure or metric of a probability or likelihood that the given sound is semantically relevant to a given user. Where the machine learning system is trained using a sufficiently large corpus of recorded sound signals and attributes of one or more users, and a reliable semantic model is developed, the confidence interval associated with relevance of a sound pressure level or intensity and a frequency of a sound, or words or speech rates within the sound, to a given user may be substantially high.

In some embodiments, a sound may be identified as semantically relevant to one of a plurality of individuals using any one of a plurality of microphones and/or a plurality of computer processors. For example, in an environment that is audibly cluttered with a variety of sounds, the sounds may be captured using a microphone and one or more computer processors provided on a first wearable or portable computer device associated with a first user, and one of the variety of sounds may be identified as semantically relevant to a second user. Information regarding the semantically relevant sound may be transmitted to a second wearable or portable computer device associated with the second user (e.g., over a network or directly), reconstructed and played to the second user via a speaker provided on the second wearable or portable computer device. The systems and methods of the present disclosure may thus use any number of microphones or other sensors to capture and process acoustic energies within an environment, and to identify which, if any, sounds included in such energies is relevant to one or more individuals within the environment, and cause such sounds, or other sounds, to be played to such individuals within the environment.

Those of ordinary skill in the pertinent arts will recognize that the systems and methods of the present disclosure may be utilized in connection with one or more other systems or methods for capturing acoustic energies or reconstructing and playing sounds. For example, where acoustic energies including a plurality of sounds are captured, and one of the sounds is deemed to be semantically relevant to a user, anti-noises may be identified, generated and emitted for each of the sounds that have not been deemed semantically relevant, e.g., to cancel the effects of such sounds on the user, and the sounds that have been deemed semantically relevant may be reconstructed and played from one or more speakers provided within close proximity to the user. In this regard, a semantically relevant sound may be identified and emphasized in both an absolute manner and a relative manner, by playing the semantically relevant sound and suppressing irrelevant sounds.

Furthermore, those of ordinary skill in the pertinent art will recognize that when a sound recognized outside of a chamber (e.g., outside of an ear chamber provided in a set of earphones) is recognized as semantically relevant, sounds previously being played within the chamber may be suppressed (e.g., by reducing a volume level of music or other sounds being played by a set of earphones) so that the semantically relevant sound may be more easily heard. Semantically relevant sounds and the anti-noises may be reproduced or played with respect to relative weights, which may be selected by one or more users or in a manner consistent with an environment in which the sounds are generated and captured. For example, a set of headphones may be configured to receive information regarding sounds surrounding the set of headphones, e.g., via one or more microphones provided on the set of headphones or elsewhere within a monitored space, until a semantically relevant sound is captured and identified as such. Thereafter, an anti-noise corresponding to sounds that are not semantically relevant may be played with a relative weight, e.g., fifty percent, to dampen the effects of such sounds from the perspective of a user, and semantically relevant sounds may be played with a corresponding relative weight, e.g., one hundred percent, to ensure that the user hears the semantically relevant sounds. In accordance with the present disclosure, semantically relevant sounds may be reproduced and played to a user at any relative weight, e.g., ranging from zero percent (e.g., the semantically relevant sounds are not played or are played at an inaudible level to the user) to one hundred percent (e.g., the semantically relevant sounds are the only sounds played at an audible level to the user). Likewise, ambient sounds, semantically irrelevant sounds, or semantically less relevant sounds may also be played to a user at any relative weight. Additionally, in some embodiments, a set of earphones or headphones may include left and right microphones for capturing acoustic energy, and left and right speakers for playing selected sounds therefrom. The left and right speakers may be configured to play reconstructed semantically relevant signals in stereo, e.g., mimicking a manner in which the semantically relevant signals would have been heard by each of the left and right ears in the absence of less relevant or irrelevant sounds. Likewise, the systems and methods of the present disclosure may further include quadraphonic microphones and/or speakers, or microphones or speakers provided in any other orientation or configuration (e.g., five-speaker, seven-speaker, 5.1-speaker or 7.1-speaker), or having any number of channels.

Those of ordinary skill in the pertinent arts will further recognize that sounds may be recognized or emitted from any type of sound sensor or sound emitting device, respectively, in accordance with the present disclosure. For example, where noise is anticipated at a given intensity and frequency, a relevant sound of the same or a similar intensity and frequency, or a sound related to the relevant sound, may be emitted from not only a traditional audio speaker provided within a set of earphones or other wearable or portable system but also from other devices such as piezoelectric components that are configured to vibrate at given resonant frequencies upon being energized or excited by an electric source.

Moreover, in accordance with the present disclosure, a trained machine learning system may be used to develop sound profiles for users based on their roles, backgrounds, interests or functions, and, based on such sound profiles, determine whether a sound is particularly relevant to that user. Furthermore, a determination that a sound is semantically relevant to a user may be based on intrinsic information or data regarding the sound or the user, e.g., sound pressure levels or intensities and frequencies of the sound, or known attributes, interests or preferences of the user, or extrinsic information or data regarding the sound or the user, e.g., information or data determined from one or more sensors, including but not limited to Global Positioning System ("GPS") receivers or sensors, compasses, speedometers, altimeters, thermometers, barometers, hygrometers, or gyroscopes.

Figure 2:
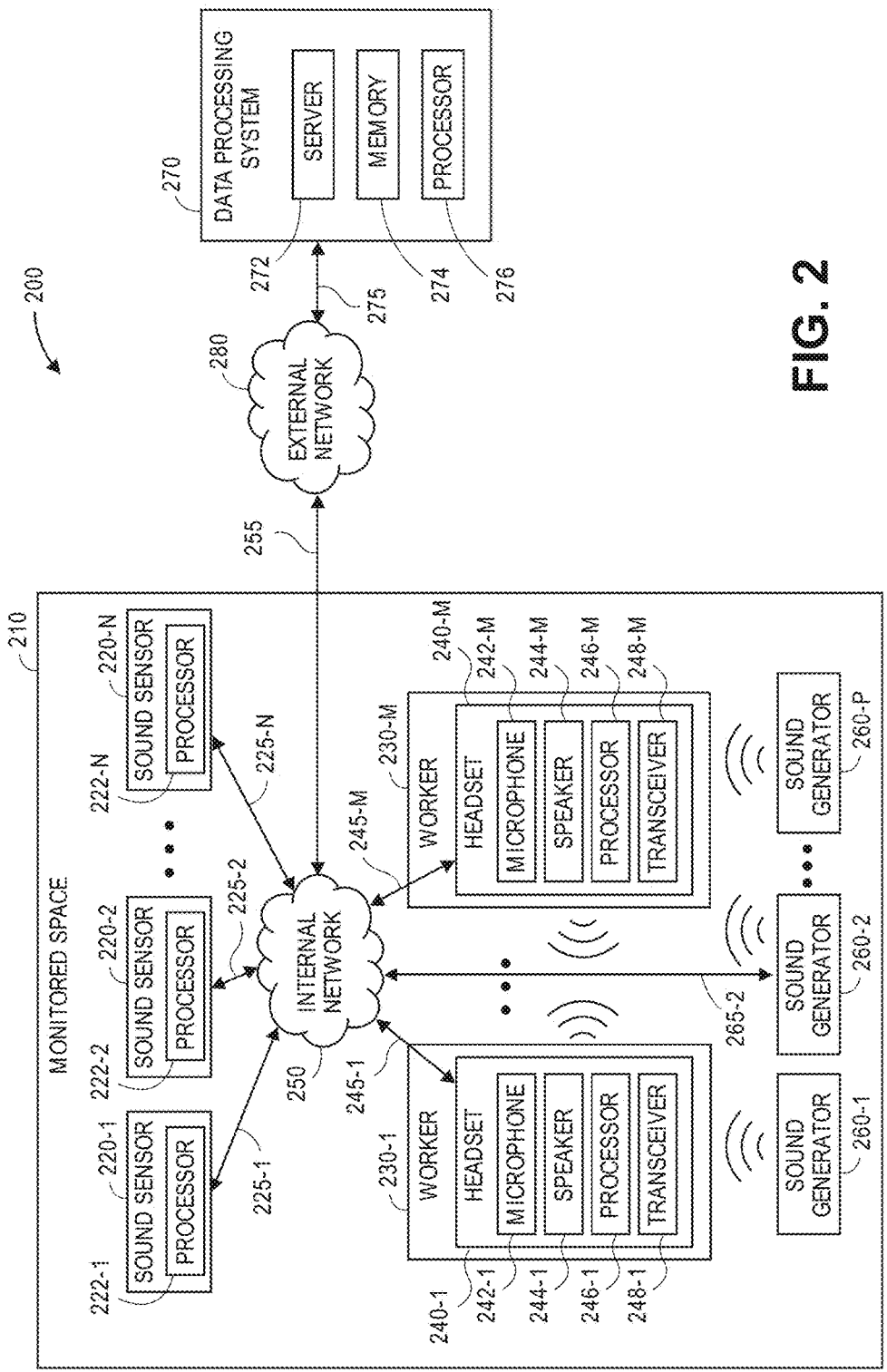
FIG. 2 is a block diagram of one system for recognizing and emitting semantically relevant sounds in accordance with embodiments of the present disclosure.

Referring to FIG. 2, a block diagram of components of one system 200 for recognizing and emitting semantically relevant sounds in accordance with embodiments of the present disclosure is shown. The system 200 of FIG. 2 includes a monitored space 210 and a data processing system 270 having components that are connected to one another over an external network 280, which may include the Internet in whole or in part. Except where otherwise noted, reference numerals preceded by the number "2" shown in the block diagram of FIG. 2 indicate components or features that are similar to components or features having reference numerals preceded by the number "1" shown in the system 100 of FIGS. 1A through 1E.

The monitored space 210 includes a plurality of sound sensors 220-1, 220-2 . . . 220-n, a plurality of workers 230-1 . . . 230-m and a plurality of sound generators 260-1, 260-2 . . . 260-p. Each of the workers 230-1 . . . 230-m is wearing a headset 240-1 . . . 240-m. Each of the sound sensors 220-1, 220-2 . . . 220-n and the headsets 240-1 . . . 240-m may be connected to one another directly or via an internal network 250, which may also include the Internet in whole or in part. At least some of the sound generators 260-1, 260-2 . . . 260-p, viz., the sound generator 260-2, may also be connected to one or more other components directly or via the internal network 250.

The sound sensors 220-1, 220-2 . . . 220-n may be any components or features for detecting, capturing and/or processing acoustic energies within the monitored space 210, including but not limited to acoustic energies generated by any of the workers 230-1 . . . 230-m (e.g., through speech or any other manual or physical actions) and/or any of the sound generators 260-1, 260-2 . . . 260-p (e.g., through any intended or unintended actions or operations). In particular, the sound sensors 220-1, 220-2 . . . 220-n may be configured to receive sound signals corresponding to verbal speech, e.g., by or between one or more of the workers 230-1 . . . 230-n, or any other sound signals corresponding to naturally or artificially generated noises within the monitored space 210.

For example, the sound sensors 220-1, 220-2 . . . 220-n may include one or more microphones, piezoelectric sensors or vibration sensors. Such microphones may be any type or form of transducer (e.g., a dynamic microphone, a condenser microphone, a ribbon microphone, a crystal microphone) configured to convert acoustic energy of any intensity and across any or all frequencies into one or more electrical signals, and may include any number of diaphragms, magnets, coils, plates, or other like features for detecting and recording such energy. In accordance with the present disclosure, microphones may be provided as discrete components, or in combination with one or more other components, e.g., an imaging device such as a digital camera, and may be configured to detect and record acoustic energy from any and all directions. Piezoelectric sensors may be configured to convert changes in pressure within the monitored space 210, including but not limited to such pressure changes that are initiated by the presence of acoustic energy across various bands of frequencies, to electrical signals, and may include one or more crystals, electrodes or other features. Vibration sensors may be any device configured to detect vibrations of one or more components within the monitored space 210, and may also include a piezoelectric device, or one or more accelerometers, e.g., an application-specific integrated circuit and one or more microelectromechanical sensors in a land grid array package, that are configured to sense differential accelerations along one or more axes over predetermined periods of time and to associate such accelerations with levels of vibration and, therefore, sound.

As is shown in FIG. 2, each of the sound sensors 220-1, 220-2 . . . 220-n includes a processor 222-1, 222-2 . . . 222-n, and may be connected to one another, or to the headsets 240-1 . . . 240-m, directly or via the internal network 250, as indicated by lines 225-1, 225-2 . . . 225-n, through the sending and receiving of digital data, and indirectly to one or more other computer devices via the external network 280, as indicated by line 255. In some embodiments, the sound sensors 220-1, 220-2 . . . 220-n may be components that are fixed to or otherwise provided in association with one or more structural components within the monitored space 210, e.g., walls, ceilings, floors or apparatuses, such as the microphones 120-1, 120-2, 120-3 of FIGS. 1A and 1C-1E, which are suspended from above the monitored space 110. Although each of the sound sensors 220-1, 220-2 . . . 220-n shown in FIG. 2 includes an associated processor 222-1, 222-2 . . . 222-n, sound sensors of the present disclosure need not each include their own computer processor, and two or more of such sensors may instead utilize or be provided in association with a single computer processor.

The workers 230-1 . . . 230-m may be any personnel for performing one or more tasks within the monitored space 210. For example, where the monitored space 210 includes a fulfillment center or warehouse, the workers 230-1 . . . 230-m may be staff or associates for receiving, storing or retrieving items at the fulfillment center or warehouse, or for processing and preparing items for delivery in response to one or more orders. Where the monitored space 210 is a school, the workers 230-1 . . . 230-m may include teachers, aides, principals or students. The type or form of workers that may utilize the systems and methods of the present disclosure, including but not limited to the headsets 240-1 . . . 240-m, is not limited.

Each of the headsets 240-1 . . . 240-*m* includes a microphone 242-1 . . . 242-*m*, a speaker 244-1 . . . 244-*m*, a processor 246-1 . . . 246-*m* and a transceiver 248-1 . . . 248-*m*, and may be connected to one another, and to the sound sensors 220-1, 220-2 . . . 220-*n*, directly or via the internal network 250, as indicated by lines 245-1 . . . 245-*m*, through the sending and receiving of digital data, or indirectly to one or more other computer devices via the external network 280.

In some embodiments, the headsets 240-1 . . . 240-*m* may comprise chambers defining openings for receiving all or portions of human ears therein, e.g., outer ear components or organs including but not limited to the antihelix, helix, lobe or concha (or external acoustic meatus), with the microphones 242-1 . . . 242-*m* provided on external surfaces of the chambers, and the speakers 244-1 . . . 244-*m* provided within such chambers, such that sounds may be emitted by such speakers 244-1 . . . 244-*m* within a close range of a human ear. In some other embodiments, the headsets 240-1 . . . 240-*m* may comprise plugs or buds having portions configured for insertion into the concha or ear canal of the human ear, in whole or in part, with the speakers 244-1 . . . 244-*m* provided within or in close proximity to the concha or ear canal, and the microphones 242-1 . . . 242-*m* provided outside of the concha or ear canal, such that sounds may be emitted by such speakers directly into the ear canal. Those of ordinary skill in the pertinent arts will recognize that the systems and methods of the present disclosure need not require a headset, however, and may be utilized in connection with devices or components that are not worn by humans or other animals.

The microphones 242-1 . . . 242-*m* may be any type of sound sensor for detecting, capturing and/or processing acoustic energies within the monitored space 210, including but not limited to acoustic energies generated by any of the workers 230-1 . . . 230-*m* (e.g., through speech or any other manual or physical actions) and/or any of the sound generators 260-1, 260-2 . . . 260-*p* (e.g., through any intended or unintended actions or operations). In particular, like the sound sensors 220-1, 220-2 . . . 220-*n*, the microphones 242-1 . . . 242-*m* may be configured to receive sound signals corresponding to verbal speech, e.g., by or between one or more of the workers 230-1 . . . 230-*n*, or any other sound signals corresponding to naturally or artificially generated noises within the monitored space 210.

For example, the microphones 242-1 . . . 242-*m* may include any type or form of transducer (e.g., a dynamic microphone, a condenser microphone, a ribbon microphone, a crystal microphone) configured to convert acoustic energy of any intensity and across any or all frequencies into one or more electrical signals, and may include any number of diaphragms, magnets, coils, plates, or other like features for detecting and recording such energy. The microphones 242-1 . . . 242-*m* may also be provided as a discrete component, or in combination with one or more other components, e.g., an imaging device such as a digital camera. Furthermore, the microphones 242-1 . . . 242-*m* may be configured to detect and record acoustic energy from any and all directions. Alternatively, the headsets 240-1 . . . 240-*m* may further include one or more piezoelectric sensors and/or vibration sensors that may act as replacements for or complements to the microphones 242-1 . . . 242-*m*.

The speakers 244-1 . . . 244-*m* may be any type or form of transducer for converting electrical signals into sound energy. Each of the speakers 244-1 . . . 244-*m* may have any degree of technical complexity, and may be, for example, an electrodynamic speaker, an electrostatic speaker, a flat-diaphragm speaker, a magnetostatic speaker, a magnetostrictive speaker, a ribbon-driven speaker, a planar speaker, a plasma arc speaker, or any other type or form of speaker. Alternatively, the speakers 244-1 . . . 244-*m* may be basic or primitive, such as a PC speaker, e.g., an audio speaker having a limited bit range or capacity. Additionally, the speakers 244-1 . . . 244-*m* may be a single speaker adapted to emit sounds over a wide range of frequency, or may include one or more components (e.g., tweeters, mid-ranges, and woofers) for emitting sounds over particular ranges of frequencies. Alternatively, the headsets 240-1 . . . 240-*m* may further include one or more piezoelectric emitters having expanding or contracting crystals that vibrate in air or another medium in order to produce sounds, or one or more vibration emitters configured to cause one or more elements of the headsets 240-1 . . . 240-*m* to vibrate at a predetermined resonance frequency, and such emitters may act as replacements for or complements to the speakers 244-1 . . . 244-*m*.

The processors 246-1 . . . 246-*m* may be any type or form of computer component or device configured to perform any type or form of computing function, including but not limited to the capture of acoustic energies using the microphones 242-1 . . . 242-*m*, the reconstruction and/or playing of one or more sound signals using the speakers 244-1 . . . 244-*m* may, or the receipt and transmission of signals, as well as the execution of one or more machine learning algorithms or techniques. For example, the processors 246-1 . . . 246-*m* may control any aspects of the operation of the headsets 240-1 . . . 240-*m* and the one or more components thereon, including but not limited to the microphones 242-1 . . . 242-*m*, the speakers 244-1 . . . 244-*m* or the transceivers 248-1 . . . 248-*m*.

The transceivers 248-1 . . . 248-*m* may be any type or form of device configured to enable the headsets 240-1 . . . 240-*m* or the components thereon to communicate through one or more wired or wireless means, e.g., wired technologies such as Universal Serial Bus (or "USB") or fiber optic cable, or standard wireless protocols such as Bluetooth® or any Wireless Fidelity (or "WiFi") protocol, with one another directly, or via the internal network 250, or with one or more other computer devices directly or via the external network 280.

The headsets 240-1 . . . 240-*m* may further include one or more sensors for determining a position, an alignment, a speed, an acceleration or any other attribute of the headsets 240-1 . . . 240-*m*, e.g., one or more Global Positioning System ("GPS") receivers or sensors, compasses, speedometers, altimeters, thermometers, barometers, hygrometers, or gyroscopes (not shown). Each of such sensors may operate in communication with or under the control of the processors 246-1 . . . 246-*m*.

Furthermore, those of ordinary skill in the pertinent arts will also recognize that the system 200 may, but need not, include both the sound sensors 220-1, 220-2 . . . 220-*n* and the microphones 242-1 . . . 242-*m*. For example, in some embodiments, the capacity of the system 200 to capture acoustic energies may be restricted to only the sound sensors 220-1, 220-2 . . . 220-*n*, and the headsets 240-1 . . . 240-*m* need not include the microphones 242-1 . . . 242-*m*. In other embodiments, the monitored space 210 need not include the sound sensors 220-1, 220-2 . . . 220-*n*, and may rely exclusively upon the microphones 242-1 . . . 242-*m* to capture acoustic energies within the monitored space 210.

The internal network 250 and/or the external network 280 may be any wired network, wireless network, or combination thereof, and may comprise the Internet in whole or in part. In addition, the internal network 250 and/or the external network 280 may be a personal area network, local area network, wide area network, cable network, satellite network, cellular telephone network, or combination thereof. The internal network 250 and/or the external network 280 may also be a publicly accessible network of linked networks, possibly operated by various distinct parties, and may include the Internet in whole or in part. In some embodiments, the internal network 250 and/or the external network 280 may be a private or semi-private network, such as a corporate or university intranet. The internal network 250 and/or the external network 280 may include one or more wireless networks, such as a Global System for Mobile Communications (GSM) network, a Code Division Multiple Access (CDMA) network, a Long Term Evolution (LTE) network, or some other type of wireless network.

The sound generators 260-1, 260-2 . . . 260-$p$ may be any individual, object or entity within the monitored space 210, or within an acoustic range of one or more sound sensors (e.g., one or more of the sound sensors 220-1, 220-2 . . . 220-$n$ and/or the microphones 242-1 . . . 242-$m$) provided within the monitored space 210, that emits or radiates acoustic energies within the monitored space 210 or within the acoustic range of the one or more sound sensors provided therein. For example, as is shown in FIGS. 1A and 1C through 1E, the sound generators 260-1, 260-2 . . . 260-$p$ may include machinery such as the autonomous mobile robots 160-1, 160-3, 160-5, the cleaning machine 160-2, or the powered cart 160-4. Alternatively, the sound generators 260-1, 260-2 . . . 260-$p$ may include one or more individuals (e.g., persons other than the workers 230-1 . . . 230-$m$), animals, machines or objects, including but not limited to machines having one or more speakers or other sound-emitting devices.

As is shown in FIG. 2, acoustic energies emitted by the sound generators 260-1, 260-2 . . . 260-$p$ may be captured and/or processed by one or more of the sound sensors 220-1, 220-2 . . . 220-$n$ and/or the microphones 242-1 . . . 242-$m$. Moreover, as is also shown in FIG. 2, one or more of the sound generators 260-1, 260-2 . . . 260-$p$, viz., the sound generator 260-2, may be connected to one another, or to the sound sensors 220-1, 220-2 . . . 220-$n$ or the headsets 240-1 . . . 240-$m$ directly or via the internal network 250, as indicated by line 265-2, through the sending and receiving of digital data, and indirectly to one or more other computer devices via the external network 280.

Protocols and components for communicating via the Internet or any of the other aforementioned types of communication networks are well known to those skilled in the art of computer communications and thus, need not be described in more detail herein. Additionally, those of ordinary skill in the pertinent arts will recognize that the internal network 250 and/or the external network 280 may be of the same type or operate according to the same protocol, or may be of different types or operate according to different protocols. For example, in some embodiments, the internal network 250 may operate according to a Bluetooth® protocol, and the external network 280 may be a wide area network operating according to a WiFi protocol, and may include the Internet in whole or in part.

Any combination of networks or protocols may be utilized in accordance with the systems and methods of the present disclosure. For example, in some embodiments, the sound sensors 220-1, 220-2 . . . 220-$n$, the headsets 240-1 . . . 240-$m$ or the sound generators 260-1, 260-2 . . . 260-$p$ may bypass the internal network 250, and connect to the external network 280 (e.g., the Internet) directly. In some other embodiments, the data processing system 270 may be connected to the internal network 250 (e.g., a local area network physically or virtually provided within the monitored space 210) and the system 200 need not include the external network 280 or access the Internet in any way. Moreover, those of ordinary skill in the pertinent arts will recognize that the sound sensors 220-1, 220-2 . . . 220-$n$, the headsets 240-1 . . . 240-$m$ and/or the sound generators 260-1, 260-2 . . . 260-$p$ may communicate with one another, or with one or more other computer devices, directly according to one or more protocols and need not require the use of a centralized network, such as the internal network 250 or the external network 280.

The data processing system 270 includes one or more physical computer servers 272 having a plurality of databases 274 associated therewith, as well as one or more computer processors 276 provided for any specific or general purpose. For example, the data processing system 270 of FIG. 2 may be independently provided for the exclusive purpose of receiving, analyzing or storing acoustic signals or other information or data received from the sound sensors 220-1, 220-2 . . . 220-$n$, the headsets 240-1 . . . 240-$m$ and/or the sound generators 260-1, 260-2 . . . 260-$p$ or, alternatively, provided in connection with one or more physical or virtual services configured to receive, analyze or store such acoustic signals, information or data, or to perform one or more other functions.

The servers 272 may be connected to or otherwise communicate with the databases 274 and the processors 276. The databases 274 may store any type of information or data, including but not limited to acoustic signals, information or data relating to acoustic signals, or information or data regarding personnel and/or their attributes, interests or preferences, for any purpose. The servers 272 and/or the computer processors 276 may also connect to or otherwise communicate with the network 280, as indicated by line 275, through the sending and receiving of digital data. For example, the data processing system 270 may include any facilities, stations or locations having the ability or capacity to receive and store information or data, such as media files, in one or more data stores, e.g., media files received from the sound sensors 220-1, 220-2 . . . 220-$n$, the headsets 240-1 . . . 240-$m$ and/or the sound generators 260-1, 260-2 . . . 260-$p$, or from one or more other external computer systems (not shown) via the network 280. In some embodiments, the data processing system 270 may be provided in a physical location. In other such embodiments, the data processing system 270 may be provided in one or more alternate or virtual locations, e.g., in a "cloud"-based environment. In still other embodiments, the data processing system 270 may be provided on one or more of the headsets 240-1 . . . 240-$m$.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The sound sensors 220-1, 220-2 . . . 220-$n$, the headsets 240-1 . . . 240-$m$, the sound generators 260-1, 260-2 . . .

260-*p* and/or the data processing system 270 may use any web-enabled or Internet applications or features, or any other client-server applications or features including E-mail or other messaging techniques, to connect to the internal network 250 and/or the external network 280, or to communicate with one another, such as through short or multimedia messaging service (SMS or MMS) text messages. For example, the sound sensors 220-1, 220-2 . . . 220-*n*, the headsets 240-1 . . . 240-*m* or the sound generators 260-1, 260-2 . . . 260-*p* may be adapted to transmit information or data in the form of synchronous or asynchronous messages to the data processing system 270 or to any other computer device in real time or in near-real time, or in one or more offline processes, via the internal network 250 and/or the external network 280. Those of ordinary skill in the pertinent art would recognize that the sound sensors 220-1, 220-2 . . . 220-*n*, the headsets 240-1 . . . 240-*m*, the sound generators 260-1, 260-2 . . . 260-*p* and/or the data processing system 270 may operate any of a number of computing devices that are capable of communicating over the internal network 250 and/or the external network 280, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer-executable" components) described herein may be stored on a computer-readable medium that is within or accessible by computers or computer components such as the processors 222-1, 222-2 . . . 222-*n*, the processors 246-1 . . . 246-*m* or the processor 276, or any other computers or control systems utilized by the sound sensors 220-1, 220-2 . . . 220-*n*, the headsets 240-1 . . . 240-*m*, the sound generators 260-1, 260-2 . . . 260-*p* or the data processing system 270, and having sequences of instructions which, when executed by a processor (e.g., a central processing unit, or "CPU"), cause the processor to perform all or a portion of the functions, services and/or methods described herein. Such computer-executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, some embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
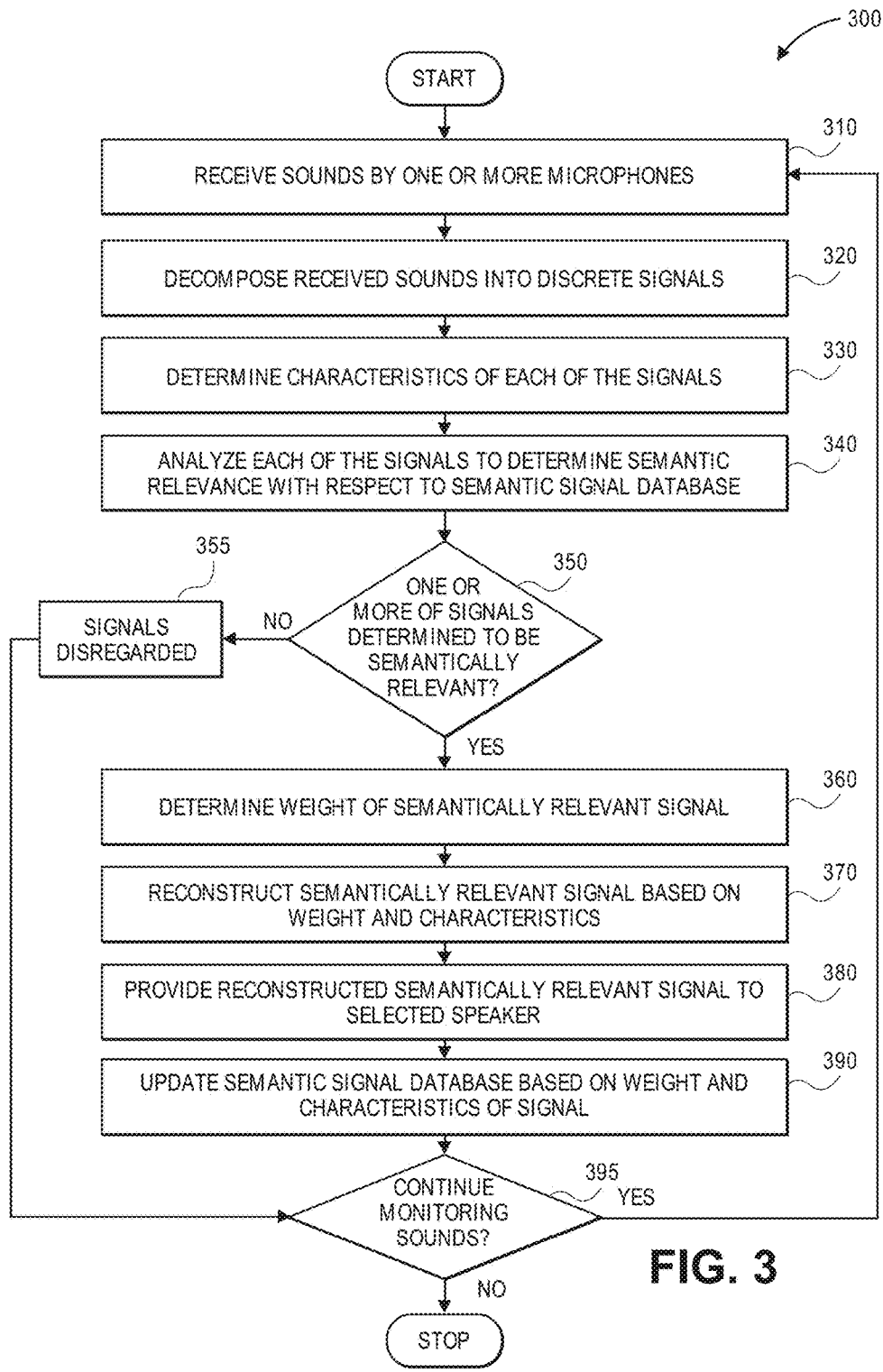
FIG. 3 is a flow chart of one process for recognizing and emitting semantically relevant sounds in accordance with embodiments of the present disclosure.

As is discussed above, the systems and methods of the present disclosure may be directed to capturing acoustic energies including one or more discrete sounds, decomposing such sounds and identifying one or more characteristics (including but not limited to sound pressure levels or intensities, frequencies, words spoken or speech rates) of such sounds, determining that one or more of the sounds is relevant to a user, and emitting such sounds, or related sounds, within a vicinity of the user (e.g., by a speaker provided within a headset worn by the user). Referring to FIG. 3, a flow chart 300 of one process for recognizing and emitting semantically relevant sounds in accordance with embodiments of the present disclosure is shown. At box 310, sounds are received by one or more microphones. For example, referring again to FIG. 1A, sounds emitted by noise-generated equipment including but not limited to the autonomous mobile robots 160-1, 160-3, 160-5, the cleaning machine 160-2, the powered cart 160-4, or any of the workers 130-1, 130-2, 130-3, 130-4, or any other sources of noise or sounds within the monitored space 110 may be captured by the microphones 120-1, 120-2, 120-3 mounted therein or one or more microphones provided on the earphones 140-1, 140-2, 140-3, 140-4, e.g., the microphone 142-1 shown in FIG. 1B.

At box 320, the sounds received by the microphones at box 310 are decomposed into a plurality of discrete signals. For example, referring again to FIG. 1A, the sounds individually generated by the noise-generating equipment 160-1, 160-2, 160-3, 160-4, 160-5, as well as the sounds generated by the worker 130-3 (e.g., the words spoken by the worker 130-3), may be separated from one another using one or more computer processors, e.g., according to a Fourier decomposition, or another form of transformation, e.g., a Fast Fourier Transform ("FFT") analysis. In some embodiments, the sounds may be decomposed according to a cepstrum analysis that differentiates between multiple signals within sound spectrums. A cepstrum analysis is sometimes described as a forward Fourier transformation of a logarithm of a spectrum, and may be used to determine any repeated patterns or periodicities within a spectrum. At box 330, characteristics of each of the discrete signals are determined. In some embodiments, intrinsic characteristics of the signals such as frequencies, intensities, words spoken or speech rates may be determined using one or more computer processors. In some embodiments, speech or speech patterns may be identified within a sound signal according to one or more NLP algorithms or techniques. Additionally, extrinsic characteristics of the signals, such as locations, velocities or accelerations of such sources, or dates or times at which such signals were received and decomposed, may also be determined using one or more computer processors.

At box 340, each of the discrete signals is analyzed to determine a level of semantic relevance thereof with respect to a semantic signal database. In some embodiments, a semantic model or other machine learning system may determine whether any of the respective signals is semantically relevant to any individuals or machines located within a predefined range or in a predefined area, based at least in part on the characteristics of the signals determined at box 330, according to one or more levels of confidence or subject to one or more thresholds. For example, a database or other data store may include one or more records including a plurality of information or data for determining whether such signals are particularly relevant to a specific individual within a monitored space (e.g., one or more of the workers 130-1, 130-2, 130-3, 130-4 of FIGS. 1A through 1E), or to individuals having a particular role or title, or individuals who are members of a group, of which one or more of the workers 130-1, 130-2, 130-3, 130-4 may be a part. Such signals may also be analyzed for semantic relevance to one or more machines, which may be configured to automatically listen for such signals and take one or more actions upon recognizing one or more of the signals. At box 350, whether one or more of the signals is semantically relevant is determined. If none of the signals is semantically relevant, then such signals are disregarded, then the process advances to box 355, where each of the signals is disregarded, and to box 395, to determine whether the continued monitoring of sounds is desired. If the continued monitoring of sounds is desired, then the process returns to box 310, where one or more additional sounds are received by the one or more microphones. If the continued monitoring of sounds is no longer desired, however, then the process ends.

If any of the signals are determined to be semantically relevant, however, then the process advances to box 360, where a weight of each of the semantically relevant signals is determined. For example, where a first signal and a second signal are determined to be semantically relevant to an individual within a monitored space to a first confidence level and a second confidence level, respectively, weights for each of the first signal and the second signal may be determined based at least in part on the first confidence level and the second confidence level, or a context in which each of the first signal and the second signal was emitted or captured. Alternatively, weights may be determined for the first signal and the second signal based on an associated levels or senses of urgency (e.g., unanticipated or time-sensitive sounds such as cries for help or requests for assistance may be weighted more strongly or highly than status reports or expected sounds). If only one signal is identified as semantically relevant, however, then a weight for the signal need not be determined, or may be determined based on the characteristics or context of that signal alone, or based on characteristics of ambient sounds within a monitored space or proximate to a user.

At box 370, the semantically relevant signals are reconstructed based on their respective weights and characteristics. For example, in some embodiments, where two signals having discrete sound pressure levels or intensities and frequencies are identified as semantically relevant, specific weights may be assigned to each of the signals, and a single signal may be formed according to such weights. Discrete signals may be reconstructed for each of the semantically relevant signals or, alternatively, a single signal including characteristics of each of the semantically relevant signals may be generated according to their respective weights.

At box 380, each of the semantically relevant signals is provided to a selected speaker, which may bear any relation to an individual to whom one or more of the signals is particularly relevant. In some embodiments, the selected speaker may be specifically associated with one or more persons for whom the signals are particularly relevant, e.g., within earphones or a headset worn by the one or more persons. In some other embodiments, the selected speaker may be provided in close proximity to the one or more persons, e.g., within a vehicle or on a structural feature known to be nearby. Alternatively, the signals provided to the selected speaker may be related to or based on the semantically relevant signal or be weighted or transformed in any manner. For example, where a microphone captures acoustic energies including speech and/or content in a first language that is particularly relevant to a user who speaks a second language, the speech and/or content may be converted to the second language, and a semantically relevant signal including the speech and/or content in the second language may be provided to a selected speaker in close proximity to the user. At box 390, the semantic signal database is updated based on the weight and the characteristics of the reconstructed signal.

At box 395, whether the continued monitoring of sounds is desired is determined. If the continued monitoring of sounds is desired, then the process returns to box 310, where one or more additional sounds are received by the one or more microphones. If the continued monitoring of sounds is no longer desired, however, then the process ends.

Figure 4A:
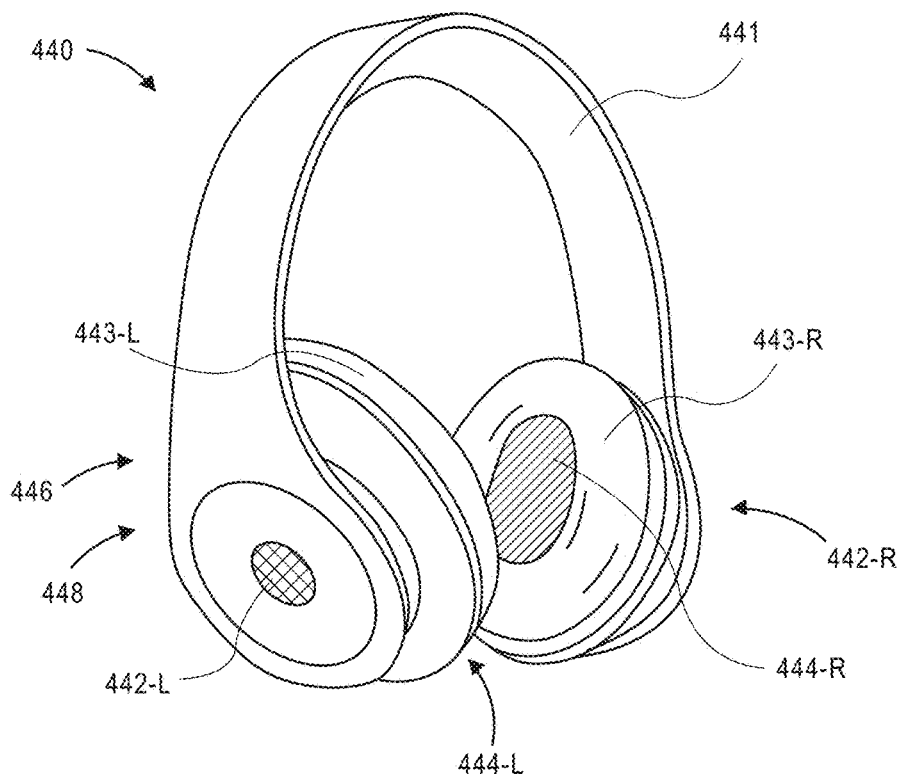
FIGS. 4A and 4B are views of aspects of one system for recognizing and emitting semantically relevant sounds in accordance with the present disclosure.
Figure 4B:
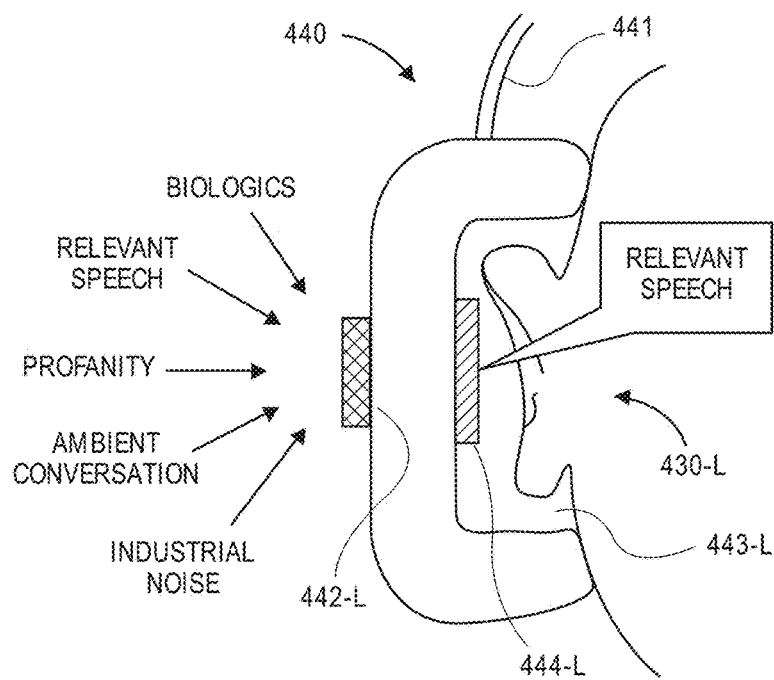

As is discussed above, the systems and methods of the present disclosure may be configured to capture information regarding a plurality of sounds in a surrounding area, e.g., a space having one or more microphones for monitoring such sounds, identifying one or more of the sounds that is semantically relevant to an individual, and playing the semantically relevant sounds from a speaker provided in close proximity to the individual, e.g., within a set of earphones or other wearable or portable systems, in a manner that filters the semantically relevant sounds from all other sounds. Referring to FIGS. 4A and 4B, a set of earphones (or headphones) 440 is shown. Except where otherwise noted, reference numerals preceded by the number "4" shown in FIGS. 4A and 4B indicate components or features that are similar to components or features having reference numerals preceded by the number "2" shown in the block diagram of FIG. 2 or by the number "1" shown in the system of FIGS. 1A through 1E.

As is shown in FIGS. 4A and 4B, the set of earphones 440 includes a frame 441 having a pair of chambers 443-L, 443-R for receiving a left ear and a right ear therein, respectively, with the left chamber 443-L having a left microphone 442-L disposed on an outer surface and a left speaker 444-L provided therein, and the right chamber 443-R having a right microphone 442-R disposed on an outer surface and a right speaker 444-R provided therein. The set of earphones 440 further includes a computer device 446 for controlling the operation of the microphones 442-L, 442-R and/or the speakers 444-L, 444-R, and a transceiver 448 for communicating with one or more other computer devices (not shown), via one or more networks. Each of the chambers 443-L, 443-R may be formed from or comprise one or more layers of sound-blocking or sound-absorbing materials to shield sounds from a wearer of the earphones 440, such that the only sounds, or the most prominent sounds, that the wearer hears are those emitted from the left speaker 444-L or the right speaker 444-R.

As is discussed above, in accordance with the present disclosure, information regarding acoustic energies may be captured, and various sounds within such energies may be decomposed and analyzed to determine whether such sounds are semantically relevant to a user, and whether such sounds are less relevant or irrelevant to the user. For example, as is shown in FIG. 4B, the set of earphones 440 may be worn by the wearer in the presence of sounds of a variety of types, intensities or frequencies, including biologic sounds (e.g., sounds emitted by animals such as dogs or birds), relevant speech (e.g., speech of co-workers, customers, children or other persons of importance), profanity (e.g., recognized swear words and other foul language), ambient conversation (e.g., irrelevant speech of others) or industrial noise (e.g., noise generated by operating machinery), or any other sounds. In accordance with the present disclosure, information regarding such sounds may be captured by the left microphone 442-L and/or the right microphone 442-R and processed to determine which of such sounds is semantically relevant to a user, before being reconstructed in real time or near-real time and played via the left speaker 444-L and/or the right speaker 444-R. As is shown in FIG. 4B, the earphones 440 may block out irrelevant or less relevant sounds such as biologics, profanity, ambient conversation or industrial noise, and may play relevant speech from one or more of the left speaker 444-L and the right speaker 444-R. Those of ordinary skill in the pertinent arts will recognize that the systems and methods of the present disclosure may include any number of microphones or other sensors, and/or speakers or other sound emitters. For example, each of the chambers 443-L, 443-R may include any number of speakers 444-L, 444-R (e.g., tweeters, mid-ranges, or woofers) for emitting sounds over wide ranges of frequencies included therein.

Figure 5:
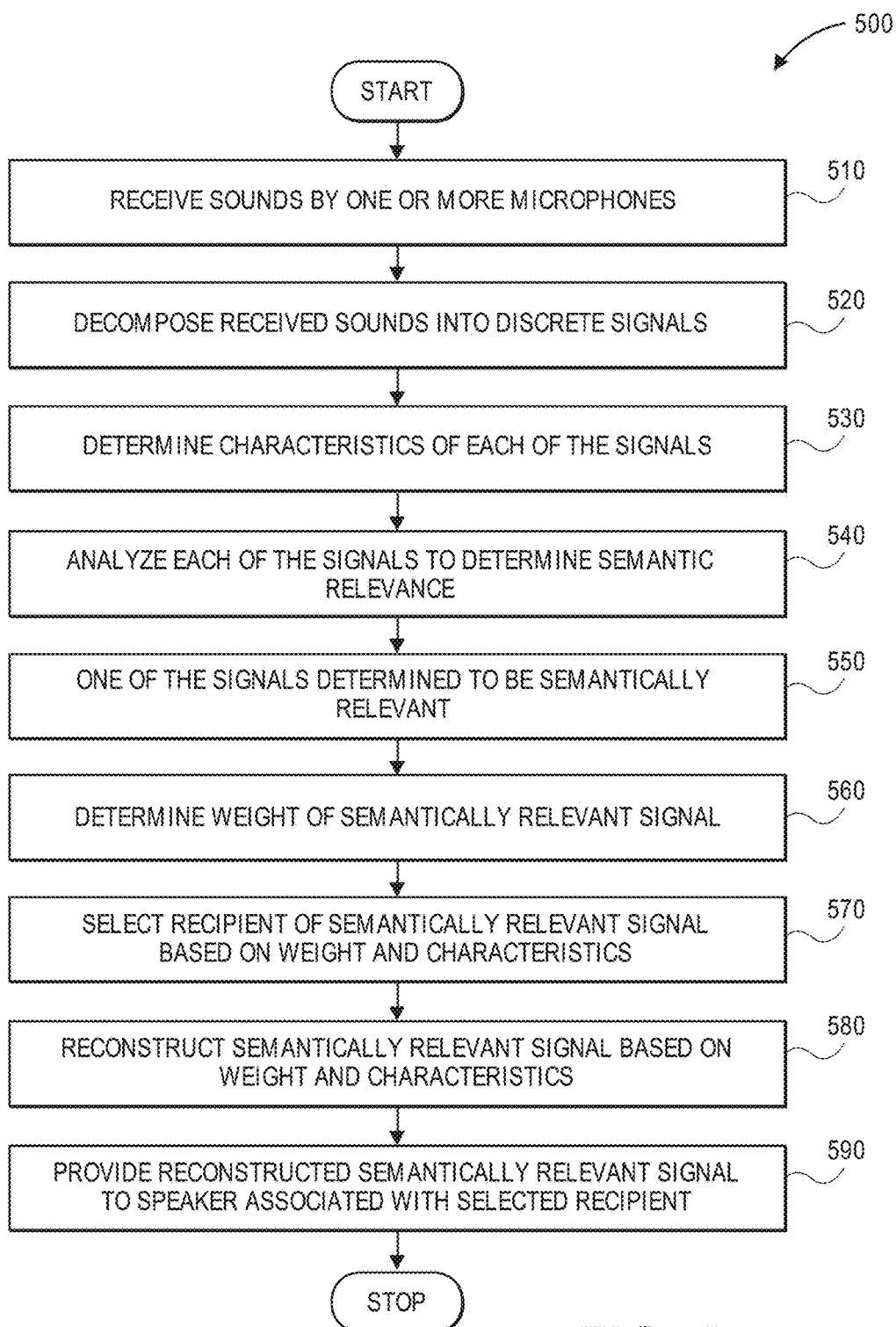
FIG. 5 is a flow chart of one process for recognizing and emitting semantically relevant sounds in accordance with embodiments of the present disclosure.

As is also discussed above, when a sound is identified as semantically relevant to a user, the sound, or a related sound, may be reconstructed and emitted from a selected speaker that is associated with the user, e.g., one or more speakers within a headset worn by the user, or mounted within a close proximity of the user. Referring to FIG. 5, a flow chart 500 of one process for recognizing and emitting semantically relevant sounds in accordance with embodiments of the present disclosure is shown. At box 510, sounds are received by one or more microphones (or other sound sensors), and at box 520, each of the sounds is decomposed into one or more discrete signals. For example, referring again to FIG. 4B, the left microphone 442-L and the right microphone 442-R (not shown) may capture information or data regarding a plurality of sounds (viz., biologics, relevant speech, profanity, ambient conversation or industrial noise) generated around the earphones 440.

At box 530, characteristics of such signals (e.g., frequencies, intensities, words spoken or speech rates of such sounds, or classifications, positions, velocities or accelerations of sources of such sounds) are determined using a computer processor, and at box 540, each of the signals is analyzed to determine whether the signal is semantically relevant. For example, intrinsic and extrinsic information or data regarding such sounds may be compared to one or more records stored in a semantic sounds database or data store, which may include information regarding attributes, interests or preferences of users, in order to determine whether the characteristics of each of the signals is associated with one or more of the users. At box 550, one of the signals is determined to be semantically relevant, and at box 560, a weight of the semantically relevant signal is determined. For example, the weight of the signal may be determined based on a confidence level or confidence score regarding the signal that may be calculated using a semantic model and/or one or more other machine learning systems.

At box 570, a recipient of the semantically relevant signal is selected based on the weight determined at box 560 and/or one or more of the characteristics of the signals determined at box 530. For example, a recipient may be selected based a level of importance or nature of the sound, any particular words included in such sounds, or any context associated with the sounds (e.g., a location, a date or a time). At box 580, the semantically relevant signal may be reconstructed based on the weight and the characteristics. At box 590, the reconstructed semantically relevant signal is provided to a speaker associated with the recipient selected at box 570, and the process ends. The speaker may be provided within one or more chambers of an earphone, e.g., the set of earphones 440 of FIGS. 4A and 4B, within another area or space in which the selected recipient is located, or within earshot of the recipient.

In accordance with some embodiments of the present disclosure, decomposing acoustic energies into discrete sounds, selecting one or more recipients for some of the discrete sounds, and causing one or more of such sounds (or related sounds) to be reconstructed and played by a selected speaker associated with such recipients is particularly useful in a number of contexts, including but not limited to settings including public safety personnel. In particular, where an environment is cluttered with a variety of sounds, the systems and methods of the present disclosure may parse such sounds to determine which of such sounds is semantically relevant to one or more persons within the environment, and reconstruct and play such sounds to such persons, e.g., via speakers provided in one or more sets of earphones or headphones. Moreover, the sounds may be reconstructed and played in a similar manner for each of the persons within the environment, or in different manners based on one or more preferences, selections or attributes of the respective persons, such as a preferred or native language, dialect or idiolect of a given user.

Figure 6A:
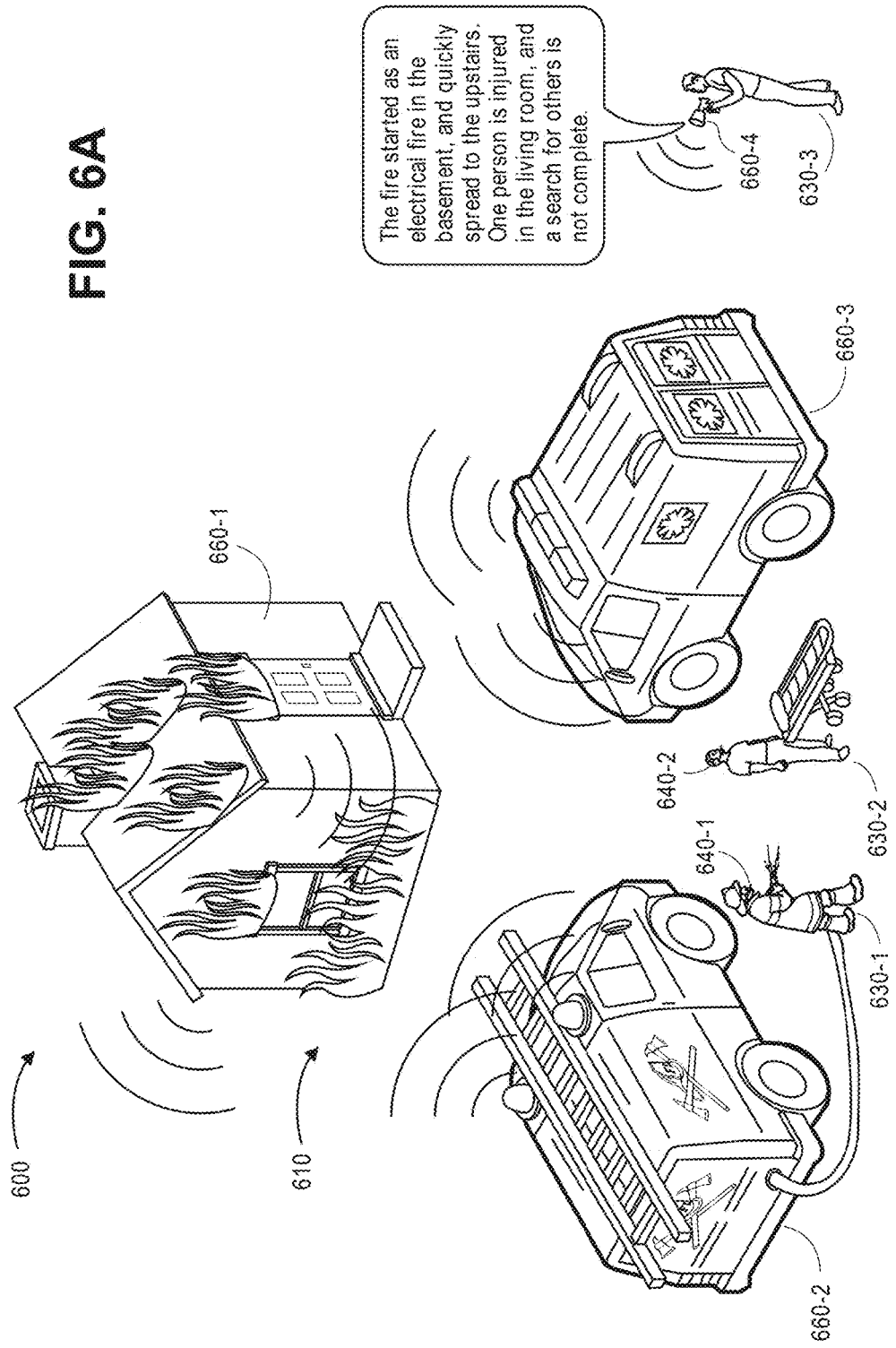
FIGS. 6A through 6C are views of aspects of one system for recognizing and emitting semantically relevant sounds in accordance with embodiments of the present disclosure.
Figures 6B, 6C:
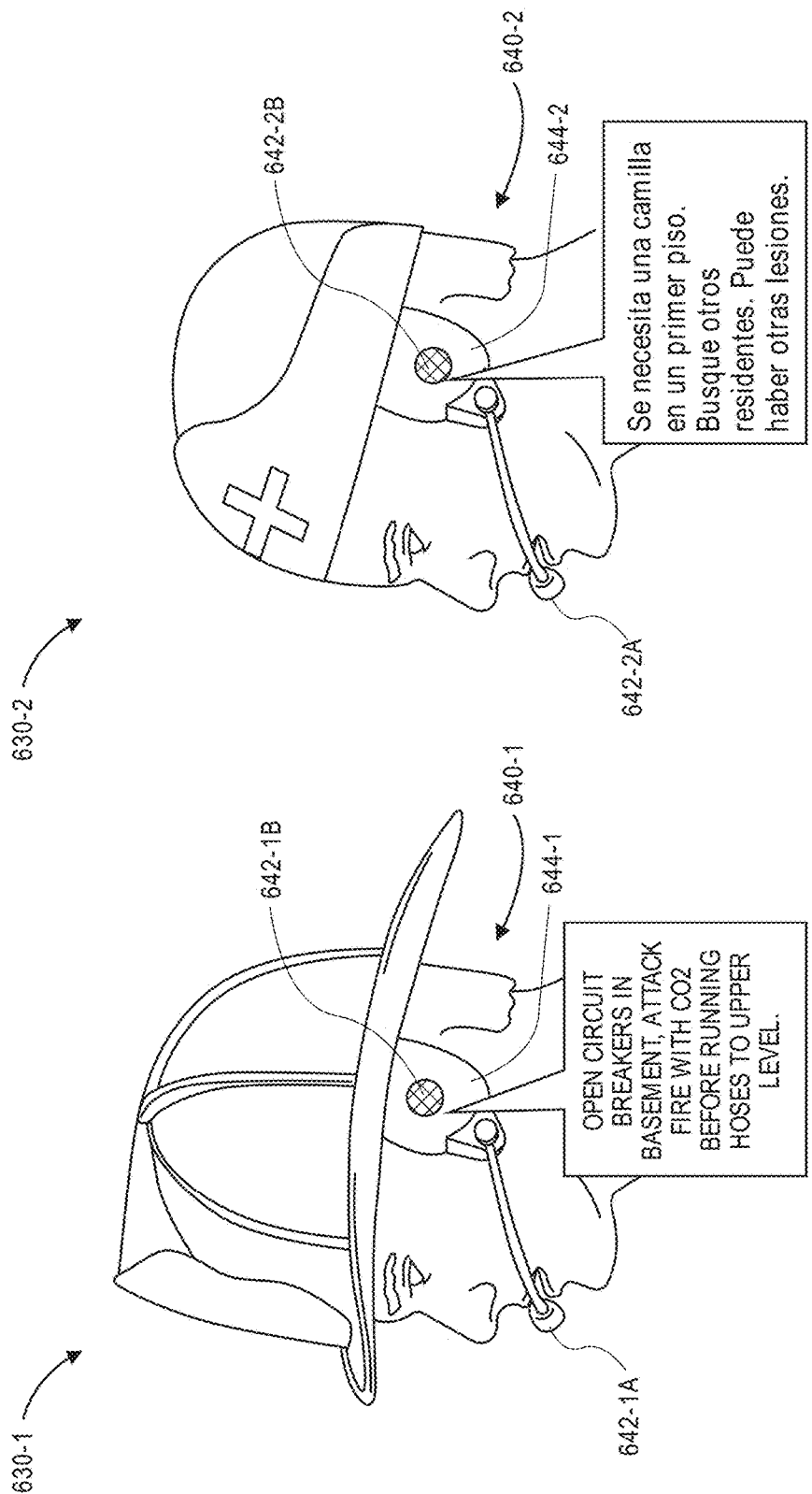

Referring to FIGS. 6A through 6C, views of aspects of one system 600 for recognizing and emitting semantically relevant sounds in accordance with embodiments of the present disclosure are shown. Except where otherwise noted, reference numerals preceded by the number "6" shown in FIGS. 6A through 6C indicate components or features that are similar to components or features having reference numerals preceded by the number "4" shown in FIGS. 4A and 4B, by the number "2" shown in the block diagram of FIG. 2 or by the number "1" shown in the system of FIGS. 1A through 1E.

As is shown in FIG. 6A, the system 600 includes a casualty scene 610 having responders 630-1, 630-2, 630-3. Each of the responders 630-1, 630-2 is wearing a headset 640-1, 640-2. The casualty scene 610 includes a number of noise-generating sources, including but not limited to a burning home 660-1, a fire truck 660-2 and an ambulance 660-3. Additionally, as is shown in FIG. 6A, the responder 630-3 is speaking information (viz., "The fire started as an electrical fire in the basement, and quickly spread to the upstairs. One person is injured in the living room, and a search for others is not complete.") regarding events or circumstances at the casualty scene 610 into a megaphone 660-4.

In accordance with the present disclosure, where an environment such as the casualty scene 610 is inundated with a variety of sounds, one or more of the systems and methods disclosed herein, including but not limited to the headsets 640-1, 640-2, may capture acoustic energies associated with such sounds, and decompose the acoustic energies into discrete signals. The systems and methods of the present disclosure may further determine which of such signals is semantically relevant to one or more of the responders 630-1, 630-2, 630-3, and may, upon identifying such semantically relevant signals, cause such signals, or signals relating to such signals, to be transmitted to the corresponding responders 630-1, 630-2, 630-3 via the headsets 640-1, 640-2. In some embodiments, for example, relevant information may be parsed from a variety of sounds, and the relevant information may be presented to the one or more of the responders 630-1, 630-2, 630-3 to whom such information is particularly relevant.

As is shown in FIG. 6B, relevant information included within the information spoken by the responder 630-3 into the megaphone 660-4 is provided to the responder 630-1, viz., a firefighter, via the headset 640-1. More specifically, the headset 640-1 is configured to play relevant information in a language native to the responder 630-1 via a speaker 644-1 (viz., "Open circuit breakers in basement, attack fire with CO2 before running hoses to upper level.") provided in close proximity to one of the ears of the responder 630-1, to receive feedback from the responder 630-1 via a first microphone 642-1A provided in close proximity to a mouth of the responder 630-1, or to capture further acoustic energies or other sounds using the first microphone 642-1A or a second microphone 642-1B provided on an external surface of the headset 640-1. As is noted in FIG. 6A and FIG. 6B, the information played from the speaker 644-1 differs from the information spoken by the responder 630-3 into the megaphone 660-4 in that the information played from the speaker 644-1 includes instructions that are semantically relevant to the responder 630-1 (e.g., instructions for fighting fires in the burning home 660-1) determined based on the information spoken into the megaphone 660-4, and does not include information that is irrelevant to the responder 630-1 (e.g., information not pertaining to fighting fires in the burning home 660-1).

Similarly, as is shown in FIG. 6C, relevant information included within the information spoken by the responder 630-3 into the megaphone 660-4 is provided to the second responder 630-2, viz., a medical professional, via the headset 640-2. More specifically, the headset 640-2 is configured to play relevant information in a language native to the responder 630-2 via a speaker 644-2 (viz., "Se necesita una camilla en un primer piso. Busque otros residentes. Puede haber otras lesiones," or, "A stretcher is needed on the first floor. Look for other residents. There may be other injuries.") provided in close proximity to one of the ears of the responder 630-2, to receive feedback from the responder 630-2 via a first microphone 642-2A, or to capture further acoustic energies or other sounds via the first microphone 642-2A or a second microphone 642-2B provided on an external surface of the headset 640-2. As is noted in FIG. 6A and FIG. 6C, the information played from the speaker 644-2 differs from the information spoken by the responder 630-3 into the megaphone 660-4 in that the information played from the speaker 644-2 includes instructions that are semantically relevant to the responder 630-2 (e.g., instructions for locating and treating injured persons in the burning home 660-1) determined based on the information spoken into the megaphone 660-4, and does not include information that is irrelevant to the responder 630-2 (e.g., information not pertaining to locating or treating injured persons in the burning home 660-1). The information played from the speaker 644-2 further differs from the information spoken by the responder 630-3 into the megaphone 660-4 in that the information played from the speaker 644-2 is in a language native to the responder 630-2 (viz., Spanish) despite the fact that the information spoken into the megaphone 660-4 is in a language native to the responder 630-3 (viz., English).

Figure 7:
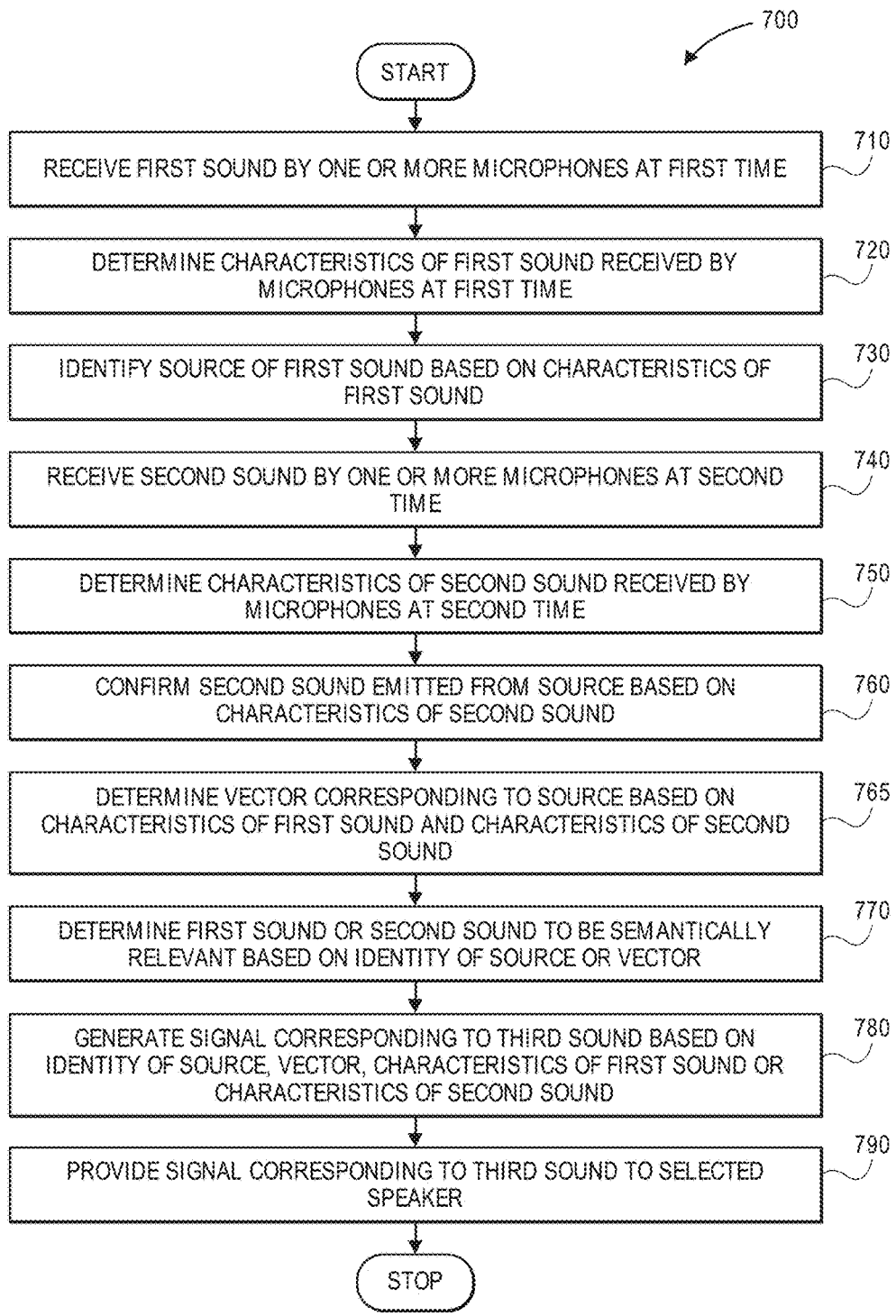
FIG. 7 is a flow chart of one process for recognizing and emitting semantically relevant sounds in accordance with embodiments of the present disclosure.

As is discussed above, when determining whether a sound is semantically relevant, the systems and methods of the present disclosure may take into account both intrinsic and extrinsic information regarding sounds and the sources from which such sounds are emitted, including but not limited to the intensities and/or frequencies of such sounds, or the classifications, positions, velocities and/or accelerations of such sources, and the projected positions of such sources over time. From this intrinsic and/or extrinsic information, one or more determinations of semantic relevance may be made. Referring to FIG. 7, a flow chart 700 of one process for recognizing and emitting semantically relevant sounds in accordance with embodiments of the present disclosure is shown. At box 710, a first sound is received by one or more microphones at a first time, and at box 720, characteristics of the first sound are determined. For example, the first sound may be one of a plurality of sounds included in acoustic energies captured by one or more sound sensors, e.g., sound sensors provided within a monitored space, such as the plurality of microphones 120-1, 120-2, 120-3 of FIGS. 1A through 1E, or sound sensors mounted to a headset or other wearable or portable computer device, such as the left microphone 442-L and/or the right microphone 442-R mounted to the set of earphones 440 of FIGS. 4A and 4B. The acoustic energies may be decomposed into discrete signals corresponding to the plurality of sounds using one or more computer processors. The first sound, and any characteristics of the first sound, including but not limited to its intensity and frequency, may be recognized as one of such sounds. Any number of intrinsic or extrinsic characteristics of the sounds may be determined, including but not limited to frequencies and intensities, as well as bearings or directions from which such sounds are believed to have been emitted. In some embodiments, a range to a source of a sound may be determined by capturing the sound using two or more discrete microphones or other sound sensors and triangulating the bearings to such sounds as observed by the discrete microphones.

At box 730, a source of the first sound is identified based on the characteristics of the first sound determined at box 720, or any other relevant information regarding the first sound. In some embodiments, the characteristics of the first sound may be analyzed according to an FFT analysis, such as a cepstrum analysis, that processes intensities and frequencies of an acoustic energy spectrum having multiple, superimposed signals, and may identify or isolate intensities and/or frequencies of each of such signals in order to associate such signals with one or more discrete sources, e.g., according to an order analysis. For example, an FFT analysis may be used to separate the various signals included in acoustic energies emitted by a rotating machine, and to identify the respective characteristics of the respective sounds (e.g., sounds corresponding to a rotating impeller, a rotating shaft and/or electrical windings or coils). Likewise, an FFT analysis may be used to separate signals included in acoustic energies that are emitted (e.g., words spoken) by various individuals, and to identify the respective words spoken and/or the individuals who spoke each of the words. Signatures of captured acoustic energy as a whole, or of the individual sounds included in the acoustic energy, may be compared to signatures of acoustic energies that are known to be associated with one or more sources, and a source of the captured acoustic energy or the individual sounds included therein may be identified thereby. For example, where a frequency and/or intensity of a sound are identified from acoustic energy, a table or other data record of frequencies or intensities that is correlated with names or classes of systems (e.g. particular motors, engines or other machines) may be consulted to determine whether the sound is consistent with one of the previously identified systems.

A source of a sound may be identified subject to any constraints or limitations. In some embodiments, where a sound having a specific frequency and intensity is recognized as originating from a particular direction, a source of the sound may be identified as one of a plurality of sources that are known or expected to be found in locations in the particular direction. For example, where a type of motor known to radiate sounds in a specific frequency spectrum is used to power an automobile and a motorboat, the source of the sound may be determined to be the automobile when the sounds are detected in a direction of a highway, and may be determined to be the motorboat when the sounds are detected in a direction of a body of water.

At box 740, a second sound is received by the one or more microphones, and at box 750, the characteristics of the second sound are determined using one or more computer processors. For example, one or more microphones or other sound sensors may be configured to continuously monitor an environment for acoustic energies. In some embodiments, the same set of microphones or sound sensors may be used to capture both the first sound at the first time and the second sound at the second time, or acoustic energy including such sounds. In some other embodiments, however, a first set of microphones or sound sensors may have captured the first sound at the first time, or acoustic energy including the first sound, and a second set of microphones or sound sensors may have captured the second sound at the second time, or acoustic energy including the second sound.

At box 760, that the second sound is emitted from the source is confirmed based on the characteristics determined at box 750. For example, the frequencies and/or intensities associated with the first sound may be compared to frequencies and/or intensities associated with the second sound, adjusted for one or more physical effects, including but not limited to Doppler effect, to confirm that the first sound and the second sound were each emitted by the source identified at box 730.

At box 765, a vector corresponding to the source is determined based on the characteristics of the first sound and the second sound. For example, where the first sound is recognized as having a first frequency and first intensity, and is detected along a first bearing, and the second sound is recognized as having a second frequency and second intensity, and is detected along a second bearing, a vector representing movement of the source may be determined. In some embodiments, the vector may be further defined based on ranges to the source, which may be determined based on the characteristics of the first sound and the second sound. For example, where a sound is captured using two or more discrete microphones, a bearing and/or a range to a source that emitted the sound may be estimated or determined by triangulation based on the frequencies and/or intensities captured by each of the microphones. At box 770, the first sound and/or the second sound are determined to be semantically relevant based on the identity of the source or the vector. At box 780, a signal corresponding to a third sound is generated based on the identity of the source, the characteristics of the first sound or the characteristics of the second sound. At box 790, the signal corresponding to the third sound is provided to a selected speaker, and the process ends.

For example, where a motor vehicle is provided with an external microphone configured to capture acoustic energies radiated outside of a passenger compartment, and one or more internal speakers configured to emit sounds within the passenger compartment, and the external microphone senses a siren or other acoustic signal corresponding to a service vehicle (e.g., an ambulance, a police car or a tow truck), the motor vehicle may determine that the siren or other acoustic signal is semantically relevant based on the fact that the source is a service vehicle. The motor vehicle may then reduce the volume of any music or other sounds being emitted by the internal speakers while causing the siren or other acoustic signal to be emitted at a discernible volume. The siren or other acoustic signal may be emitted from one of the internal speakers that is provided within close proximity to the driver of the motor vehicle, or from two or more internal speakers within the passenger compartment, as needed.

Alternatively, the motor vehicle may determine that the sound is semantically relevant if the service vehicle is approaching the motor vehicle, or that the siren or other acoustic signal is irrelevant if the service vehicle is not approaching the motor vehicle or is not expected to encounter or cross paths with the motor vehicle in the near future. In some embodiments, the internal speaker may be configured to emit a reconstructed signal corresponding to the siren, or a related signal (e.g., the words "a service vehicle is approaching!").

Accordingly, by recognizing intrinsic and extrinsic information or data regarding sounds emitted in a given environment, and classifying sources of such sounds based on such information or data, the systems and methods of the present disclosure may be particularly useful in ensuring the safety of one or more members or participants in an area in which sounds of a variety of intensities or frequencies that are emitted by any number of sources may be expected. Referring to FIGS. 8A through 8E, views of aspects of one system 800 for recognizing and emitting semantically relevant sounds in accordance with embodiments of the present disclosure are shown. Except where otherwise noted, reference numerals preceded by the number "8" shown in FIGS. 8A through 8E indicate components or features that are similar to components or features having reference numerals preceded by the number "6" shown in FIGS. 6A through 6C, by the number "4" shown in FIGS. 4A and 4B, by the number "2" shown in the block diagram of FIG. 2 or by the number "1" shown in the system of FIGS. 1A through 1E.

The system 800 includes an intersection 810 being approached by a bicyclist 830 wearing a bicycle helmet 840 according to one embodiment of the present disclosure. As is shown in FIG. 8A, within a vicinity of the intersection 810, a plurality of automobiles 860-1, 860-2, 860-3, an airplane 860-4, a lawn mower 860-5 and a tractor 860-6 are observed at a first time $t_1$. As is shown in FIG. 8A, the bicyclist 830 is traveling in a bicycle lane on a first street 812 of the intersection 810 with the first automobile 860-1 radiating sounds at a frequency $f_1(t_1)$ and from a bearing $\theta_1(t_1)$ while approaching on an opposite side of the first street 812, the second automobile 860-2 radiating sounds at a frequency $f_2(t_1)$ and from a bearing $\theta_2(t_1)$ while approaching from a left direction on a second street 814 of the intersection 810, and the third automobile 860-3 radiating sounds at a frequency $f_3(t_1)$ and from a bearing $\theta_3(t_1)$ while approaching the bicyclist 830 from behind on the first street 812. The airplane 860-4 radiates sounds at a frequency $f_4(t_1)$ and from a bearing $\theta_4(t_1)$ while flying over the intersection 810. The lawn mower 860-5 radiates sounds at a frequency $f_5(t_1)$ and from a bearing $\theta_5(t_1)$ while traveling away from the bicyclist 830 on the same side of the first street 812 as the bicyclist 830. The tractor 860-6 radiates sounds at a frequency $f_6(t_1)$ and from a bearing $\theta_6(t_1)$ while traveling in an opposite direction from the bicyclist 830 on another side of the first street 812.

Figure 8B:
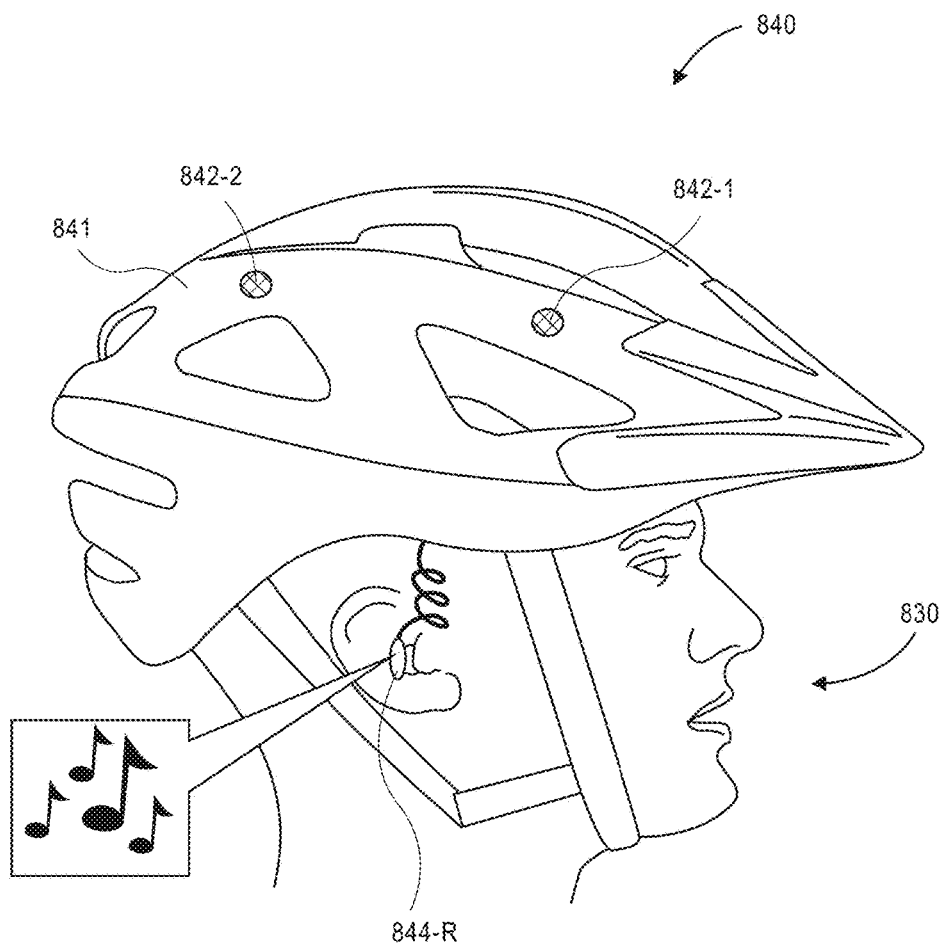

As is shown in FIG. 8B, the bicycle helmet 840 worn by the bicyclist 830 includes a frame 841 having plurality of microphones 842-1, 842-2 disposed on an upper surface thereof, and at least one ear bud, e.g., a right ear bud 844-R, for playing sounds into one or both of the ears of the bicyclist. The plurality of microphones 842-1, 842-2 may be disposed in different locations of the frame 841, in order to capture acoustic energies radiated from sources located in any number of directions or bearings with respect to the bicyclist 830, including but not limited to sounds generated by the automobiles 860-1, 860-2, 860-3, the airplane 860-4, the lawn mower 860-5 or the tractor 860-6 shown in FIG. 8A, or any other sources (e.g., biologics or other speech). Although the view of the bicycle helmet 840 shown in FIG. 8B includes only two microphones 842-1, 842-2 disposed on the frame 841, those of ordinary skill in the pertinent arts will recognize that the systems and methods of the present disclosure may include any number of microphones or other sound sensors, which may be distributed radially evenly with respect to a point or area, or in any other configuration.

Figure 8C:
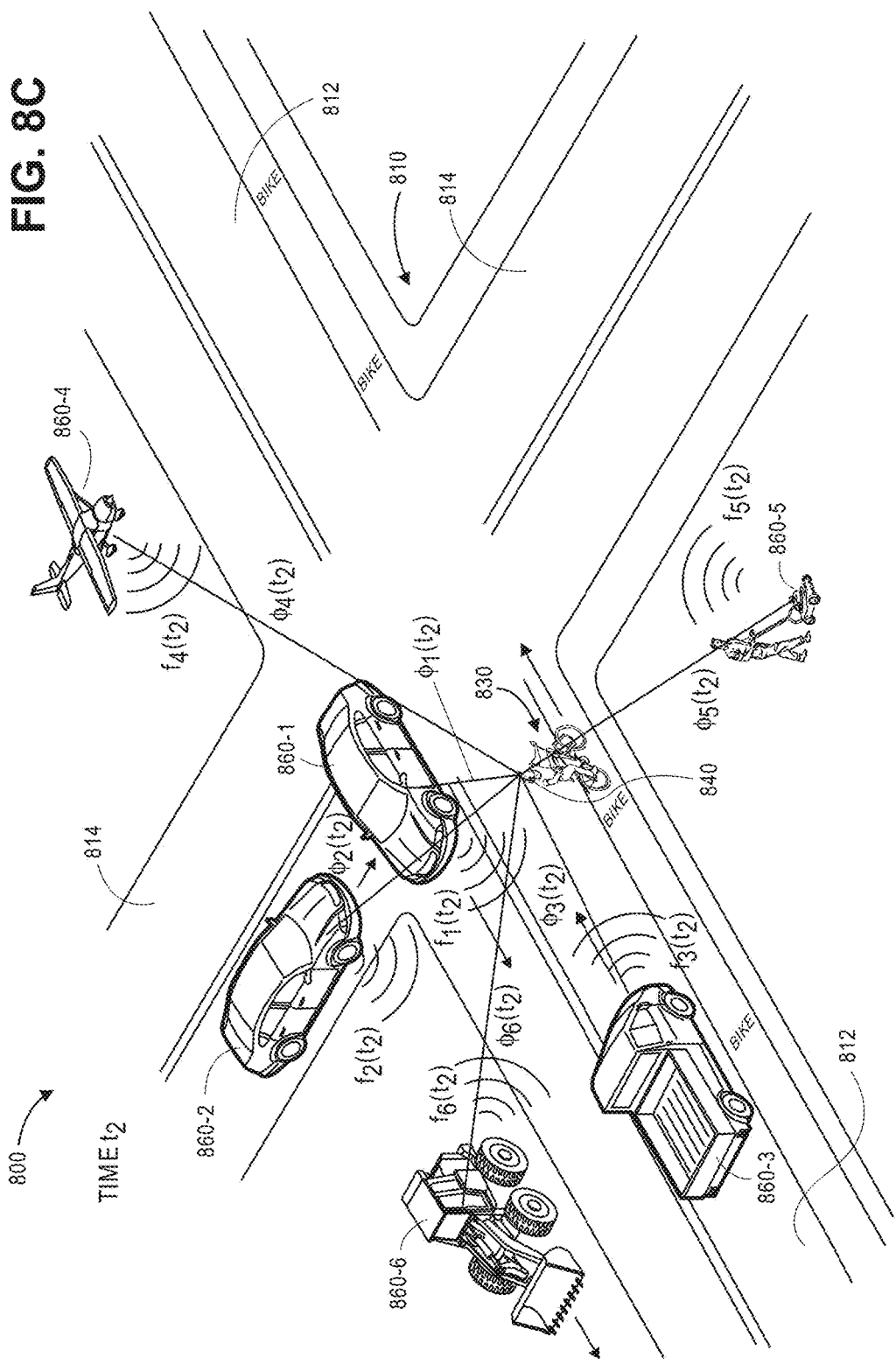

In accordance with the present disclosure, sounds may be determined to be semantically relevant based on not only their intensities or frequencies but also directions or bearings from which such sounds are detected, or the classifications, positions, velocities and/or accelerations of the sources from which such sounds are emitted, the bearings or ranges to such sources, or any other relevant characteristics. Such characteristics may be tracked over time and used to classify the sounds or the sources accordingly. As is shown in FIG. 8C, the automobiles 860-1, 860-2, 860-3, the airplane 860-4, the lawn mower 860-5 and the tractor 860-6 are observed at a second time $t_2$. For example, as of the second time $t_2$, the first automobile 860-1 has passed through the intersection 810 on the first street 812, while the second automobile 860-2 and the third automobile 860-3 have moved closer to the intersection 810 on the second street 814 and the first street 812, respectively, as compared to their respective positions at the first time $t_1$. Likewise, and also as of the second time $t_2$, the airplane 860-4 has passed directly over the intersection 810, while the lawn mower 860-5 and the tractor 860-6 have moved farther from the first street 812 and the second street 814, respectively, as compared to their respective positions at the first time $t_1$. As is further shown in FIG. 8C, the first automobile 860-1, the second automobile 860-2 and the third automobile 860-3 radiate sounds at frequencies $f_1(t_2)$, $f_2(t_2)$, $f_3(t_2)$ and from bearings $\theta_1(t_2)$, $\theta_2(t_2)$ $\theta_3(t_2)$, respectively, at the second time $t_2$, while the airplane 860-4, the lawn mower 860-5 and the tractor 860-6 radiate sounds at frequencies $f_4(t_2)$, $f_5(t_2)$, $f_6(t_2)$ and from bearings $\theta_4(t_2)$, $\theta_5(t_2)$, $\theta_6(t_2)$, respectively, at the second time $t_2$.

Figure 8D:
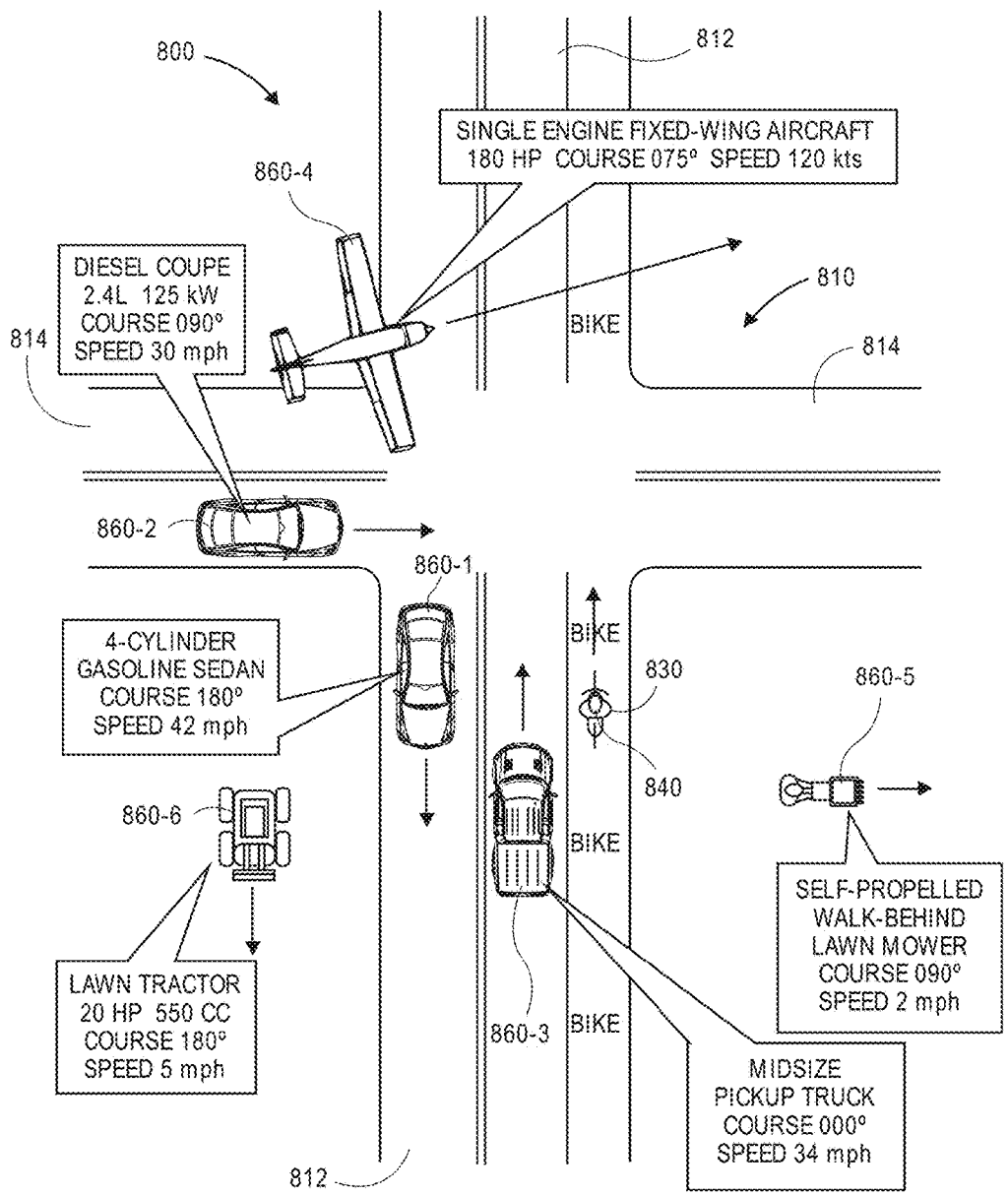

Based on the characteristics of the noises emitted by the various sources (e.g., the automobiles 860-1, 860-2, 860-3, the airplane 860-4, the lawn mower 860-5 or the tractor 860-6) at or near the intersection 810, including the frequencies or intensities of such sounds and the bearings from which such sounds were generated, the respective sources may be independently recognized and classified, and information or data regarding the sources including but not limited to vectors corresponding to their classifications, positions, velocities and/or accelerations may be determined thereby. As is shown in FIG. 8D, based on the sounds recognized at the first time $t_1$ and the second time $t_2$, the first automobile 860-1 is determined to be a four-cylinder gasoline-powered sedan heading on a course of one hundred eighty degrees (180°) and at a speed of forty-two miles per hour (42 mph), the second automobile 860-2 is determined to be a diesel coupe having a 2.4-liter, one hundred twenty-five kilowatt (125 kW) engine, heading on a course of ninety degrees (090°) and at a speed of thirty miles per hour (30 mph), and the third automobile 860-3 is determined to be a midsize pickup truck heading on a course of zero degrees (000°) and at a speed of thirty-four miles per hour (34 mph). As is also shown in FIG. 8D, based on the sounds recognized at the first time it and the second time $t_2$, the airplane 860-4 is determined to be a single-engine fixed-wing aircraft having a one hundred eighty horsepower (180 HP) engine heading on a course of seventy-five degrees (075°) and a speed of one hundred twenty knots (120 kts). As is further shown in FIG. 8D, based on the sounds recognized at the first time $t_1$ and the second time $t_2$, the lawn mower 860-5 is determined to be a self-propelled walk-behind mower heading on a course of ninety degrees (090°) at a speed of two miles per hour (2 mph), and the tractor 860-6 is determined to have a twenty horsepower (20 HP), five hundred fifty cubic centimeter (550 cc) engine, and is heading on a course of one hundred eighty degrees at a speed of five miles per hour (5 mph).

Figure 8E:
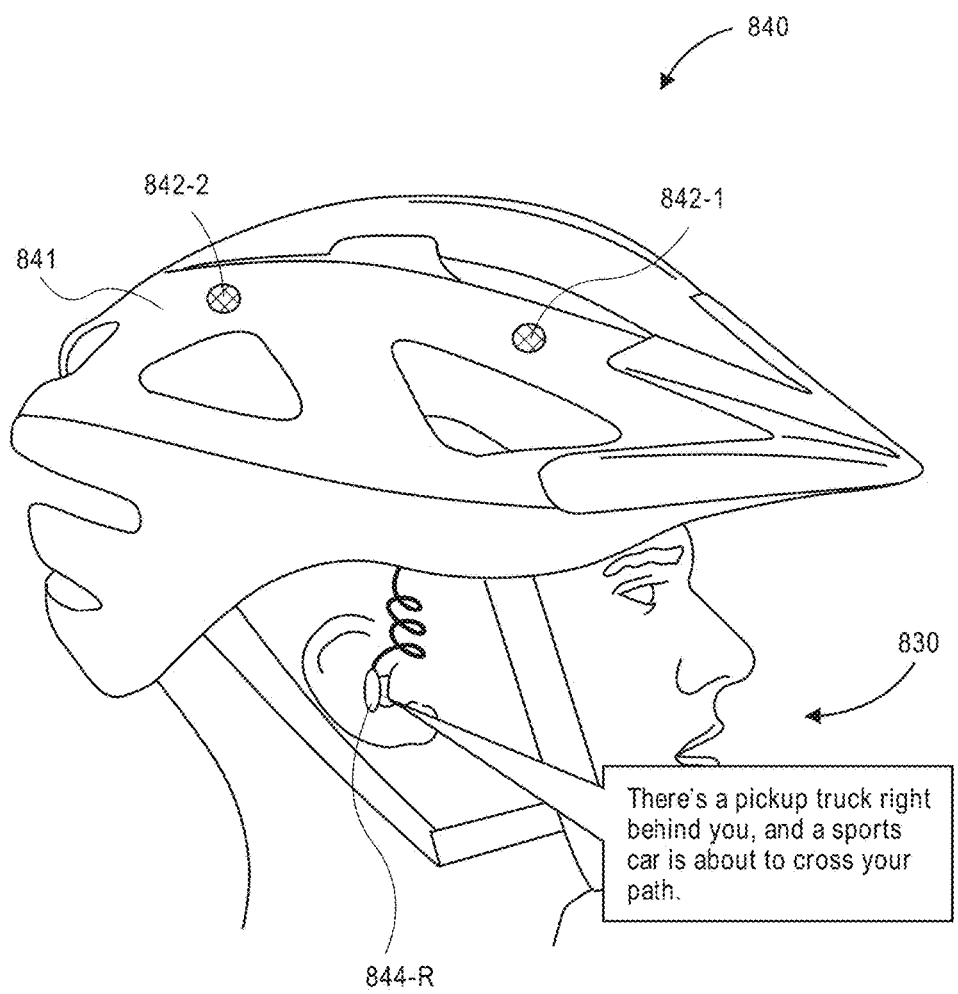

Upon recognizing the individual sounds generated by a plurality of sources, viz., the automobiles 860-1, 860-2, 860-3, the airplane 860-4, the lawn mower 860-5 or the tractor 860-6, and classifying each of the sources, the systems and methods of the present disclosure may determine whether any of the sounds is relevant to the bicyclist 830. In particular, the systems and methods of the present disclosure may determine whether any of the sources constitutes a safety issue to the bicyclist 830 and, if so, generate one or more sound signals regarding such safety issues to be played by the ear bud 844-R. As is shown in FIG. 8E, the playing of music from the ear bud 844-R has stopped, and words regarding safety issues posed by the third automobile 860-3 and the second automobile 860-2 (viz., warnings such as "[t]here's a pickup truck right behind you, and a sports car is about to cross your path") are played instead.

Those of ordinary skill in the pertinent arts will recognize that the systems and methods of the present disclosure may be provided for use in any number of applications. For example, one system may include a set of semantic earphones to be worn by babies, children or senior citizens in loud or noisy environments. Such a set of earphones may recognize and selectively amplify voice signals of critical importance to a wearer (e.g., voices of a parent of a baby or child, or of a caregiver for a senior citizen), music, or sounds having specific intensities or specific frequencies while eliminating all other audio signals. Criteria for filtering or eliminating sound signals may include signal amplitude (e.g., loud drum beats), frequency (e.g., shrill or high-frequency sounds). Persons having ears that are highly sensitive to loud noises, or persons who face hearing loss due to noise histories, aging, disease or prior incidents may wear the earphones and enhance their ability to recognize, discern and tune into relevant user-specific sounds, and to filter out sounds that are irrelevant to the user.

As is noted above, another system may include a set of smart earphones for first responders, e.g., police, fire or medical technicians. For example, first responders who enter zones of high ambient noise, such as fires, accidents or crime scenes, frequently have difficulty recognizing and understanding relevant audio signals while having conversations with peers or coordinators. A set of smart earphones may process relevant sound signals within such zones, as well as incoming voice signals on an electronic channel (e.g., a voice communications network), and prioritize and blend such signals in a manner that causes most important or most relevant sounds be readily heard by a wearer.

Another system may include a set of surrounding-aware headphones. Presently, audible headphones are unable to distinguish between their respective surroundings, or to recognize audio signals that emanate from their surroundings and are external to such headphones. For example, while a smartphone or in-dash navigation or audio system in a vehicle may mute sounds being played when an incoming telephone call is received, such systems are unable to process ambient sound signals in any manner, to determine that one or more of such sound signals is semantically relevant based on a context, or to adjust a volume of sounds being played in order to amplify a particularly relevant sound. A set of surrounding-aware headphones may prioritize and amplify relevant noises such as car honks emitted by nearby vehicles with respect to music, navigation instructions or any other sounds being played by the headphones when the relevant noises are recognized.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the embodiments disclosed herein reference the use of specially configured ear plugs, ear buds, or earphones having computing processors or components provided within close proximity of a user's ears, the systems and methods of the present disclosure are not so limited. In some embodiments, for example, the systems and methods of the present disclosure may be provided in connection with a general-purpose device, such as a tablet or smartphone, and may utilize standard equipment associated with such devices including but not limited to microphones, speakers, earphones or ear buds (e.g., ⅛" jack devices or any other relevant audio components), processors and/or network connectivity devices (e.g., transceivers) to capture acoustic energies, analyze one or more sounds or sound signals included therein, compare such sounds or signals to one or more standards, determine whether any of such sounds or signals is relevant, and reconstruct or replay such sounds or signals to a user. Those of ordinary skill in the pertinent arts will recognize that the systems and methods of the present disclosure are not limited to any one embodiment described or depicted herein.

For example, the present disclosure may be directed to any audio filtering, amplification or noise reduction system that analyzes, separates and selectively classifies the specific content of disparate audio signals (e.g., sounds or noise associated with voices, instrumentation, machinery, vehicles or other sources) and either accentuates or attenuates such sounds based on their respective classifications. The present disclosure may further be directed to any audio system that reconstitutes an incoming audio signal in order to obtain a best and most relevant auditory response from a specific user in real time or near-real time. The present disclosure may also be directed to any audio signal selection system that suppresses or amplifies signals based on the respective relevance of their content for a specific user within a defined time period, and adapts a selected signal or signals, for any relevant purpose.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 3, 5 or 7, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y. and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A working environment comprising:
a plurality of microphones, wherein at least a first microphone of the plurality of microphones is mounted to one of a wall, a ceiling, a floor or an apparatus within the working environment;
a plurality of workers, wherein each of the plurality of workers is wearing a wearable computer device having an ear chamber and a speaker within the ear chamber;
a computer network; and
at least one server in communication with each of the plurality of microphones and each of the plurality of wearable computer devices via the computer network,
wherein the at least one server is configured to at least:
receive, via the computer network, information regarding acoustic energy captured via one or more of the plurality of microphones;
recognize, from the acoustic energy, a first plurality of sound signals;
perform an analysis of each of the first plurality of sound signals;
determine, based at least in part on the analysis of a first sound signal of the first plurality of sound signals, that the first sound signal is relevant to a first worker of the plurality of workers;
determine a confidence level of an association between the first worker and the first sound signal;
assign a first weight to the first sound signal based at least in part on the confidence level;
identify a first wearable computer device worn by the first worker, wherein the first wearable computer device comprises a first ear chamber and a first speaker within the first ear chamber;
reconstruct the first sound signal;
transmit, via the computer network, information regarding a second plurality of sound signals to the first wearable computer device, wherein the second plurality of sound signals comprises the reconstructed sound signal and a second sound signal; and
cause the first wearable computer device to emit the second plurality of signals via the first speaker,
wherein the reconstructed first sound signal is emitted at a sound pressure level consistent with the first weight, and
wherein the second sound signal is emitted at a sound pressure level consistent with a second weight.

2. The working environment of claim 1, wherein the at least one server is further configured to at least:
determine, based at least in part on the analysis of the first sound signal, that the first sound signal comprises a plurality of words spoken by a second worker of the plurality of the workers; and
determine, based at least in part on the analysis of the first sound signal, that at least one of the plurality of words spoken by the second worker is relevant to the first worker,
wherein the reconstructed first sound signal comprises the at least one of the plurality of words spoken by the second worker.

3. The working environment of claim 1, wherein the at least one server is further configured to at least:
recognize, from the acoustic energy, the first plurality of sound signals according to a cepstrum analysis; and
perform the analysis of each of the first plurality of sound signals according to a natural language processing algorithm.

4. The working environment of claim 1, wherein the at least one server is further configured to at least:
determine at least one characteristic of the first sound signal, wherein the at least one characteristic is at least one of a frequency of the first sound signal, a sound pressure level of the first sound signal, at least one spoken word included in the first sound signal, a rate of speech in the first sound signal, a classification of a source of the first sound signal, a position of the source of the first sound signal, a velocity of the source of the first sound signal, an acceleration of the source of the first sound signal; and
identify information regarding the at least one characteristic of the first sound signal in at least one data store, wherein the at least one data store comprises semantic data correlating characteristics of sound signals to the plurality of workers,
wherein the first sound signal is determined to be relevant to the first worker based at least in part on the at least one characteristic of the first sound signal and the information regarding the at least one characteristic of the first sound signal.

5. The working environment of claim 1, wherein the plurality of microphones includes a second microphone mounted to a second wearable computer device worn by a second worker of the plurality of workers, and
wherein at least some of the information regarding the acoustic energy within the working environment is captured via the second microphone.

6. A method comprising:
identifying information regarding a first plurality of sound signals captured at a first time using at least a first sound sensor;
determining at least a first characteristic of a first sound signal using at least one computer processor, wherein the first sound signal is one of the first plurality of sound signals;
determining that the first sound signal is relevant to a first individual based at least in part on the first characteristic of the first sound signal using the at least one computer processor;
in response to determining that the first sound signal is relevant to the first individual,
automatically selecting at least a first sound emitting device associated with the first individual using the at least one computer processor, wherein the first sound emitting device is one of a plurality of sound emitting devices, and wherein each of the sound emitting devices is associated with at least one individual, and wherein the first sound emitting device was emitting a third sound signal at a first sound pressure level prior to the first time;
defining a second sound signal based at least in part on the first sound signal using the at least one computer processor;
causing the third sound signal to be emitted by the first sound emitting device at a second sound pressure level after the first time using the at least one computer processor, wherein the second sound pressure level is less than the first sound pressure level; and
causing the second sound signal to be emitted by at least the first sound emitting device at a third sound pressure level after the first time using the at least one computer processor,
wherein the third sound pressure level is greater than the second sound pressure level.

7. The method of claim 6, wherein the first characteristic is one of:
- at least one frequency of the first sound signal;
- at least one sound pressure level of the first sound signal;
- at least one spoken word included in the first sound signal;
- a rate of speech included in the first sound signal;
- a bearing to a source of the first sound signal;
- a location of the source of the first sound signal;
- a velocity of the source of the first sound signal; or
- an acceleration of the source of the first sound signal.

8. The method of claim 6, wherein determining that the first sound signal is relevant to the first individual further comprises:
- identifying a data store comprising a plurality of records correlating characteristics of sound signals to individuals;
- determining that the data store comprises at least one record corresponding to the first characteristic of the first sound signal, and
- selecting the first individual based at least in part on the at least one record.

9. The method of claim 6, wherein the second sound signal is the first sound signal.

10. The method of claim 6, wherein determining that the first sound signal is relevant to the first individual further comprises:
- determining that the first sound signal comprises a first plurality of words spoken by a second individual using the at least one computer processor; and
- determining that the first sound signal is relevant to the first individual based at least in part on at least one of the first plurality of words spoken by the second individual using the at least one computer processor,
- wherein the second sound signal is defined based at least in part on the at least one of the first plurality of words spoken by the second individual using the at least one computer processor.

11. The method of claim 10, wherein the second sound signal includes the at least one of the first plurality of words.

12. The method of claim 10, wherein the at least one of the first plurality of words is in a first language, and
- wherein selecting the second sound signal further comprises:
- identifying a second plurality of words in a second language using the at least one computer processor, wherein the second plurality of words corresponds to the at least one of the first plurality of words, and
- wherein the second sound signal comprises the second plurality of words in the second language.

13. The method of claim 6, wherein determining that the first sound signal is relevant to the first individual further comprises:
- classifying a source of the first sound signal based at least in part on the first characteristic of the first sound signal; and
- determining that the first sound signal is relevant to the first individual based at least in part on the classification of the source of the first sound signal.

14. The method of claim 6, wherein the first characteristic is a first frequency of the first sound signal, and
- wherein determining that the first sound signal is relevant to the first individual further comprises:
- determining at least one of a position or a velocity of a source of the first sound signal based at least in part on the first frequency of the first sound signal; and
- determining that the first sound signal is relevant to the first individual based at least in part on the position or the velocity of the source of the first sound signal.

15. The method of claim 6, wherein identifying the information regarding the first plurality of sound signals further comprises:
- identifying acoustic energy captured at a first time using at least the first sound sensor using at least one computer processor; and
- decomposing the acoustic energy into the first plurality of sound signals using the at least one computer processor.

16. The method of claim 15, wherein decomposing the acoustic energy into the first plurality of sound signals further comprises:
- performing a cepstrum analysis on at least some of the acoustic energy; and
- identifying the first plurality of sound signals based at least in part on the cepstrum analysis.

17. The method of claim 6, further comprising:
- in response to determining that the first sound signal is relevant to the first individual,
- identifying information regarding a third sound signal, wherein the third sound signal is one of the first plurality of sound signals captured using the first sound sensor; and
- defining a fourth sound signal based at least in part on the information regarding the third sound signal using the at least one computer processor, wherein the fourth sound signal is an anti-noise for the third sound signal,
- wherein causing the second sound signal to be emitted by the first sound emitting device further comprises:
- causing the fourth sound signal to be emitted by at least the first sound emitting device using the at least one computer processor.

18. The method of claim 6, wherein the first sound emitting device is provided inside of a first chamber mounted to a wearable frame,
- wherein the first chamber is configured to receive at least a portion of one ear of the first individual therein, and
- wherein the first sound sensor is provided outside of the first chamber.

19. The method of claim 6, wherein the first sound emitting device is provided within a plug configured for insertion into one ear of the first individual.

20. The method of claim 6, wherein the first sound emitting device is provided inside of a passenger compartment of a vehicle associated with the first individual, and
- wherein the first sound sensor is provided outside of the passenger compartment.

21. A method comprising:
- identifying information regarding a first plurality of sound signals captured using at least a first sound sensor;
- determining at least a first characteristic of a first sound signal using at least one computer processor, wherein the first sound signal is one of the first plurality of sound signals;
- determining that the first sound signal is relevant to a first individual based at least in part on the first characteristic of the first sound signal using the at least one computer processor, wherein determining that the first sound signal is relevant to the first individual comprises:
- determining a confidence level of an association between the first individual and the first sound signal; and assigning a first weight to the first sound signal based at least in part on the confidence level;

in response to determining that the first sound signal is relevant to the first individual, automatically selecting at least a first sound emitting device associated with the first individual using the at least one computer processor, wherein the first sound emitting device is one of a plurality of sound emitting devices, and wherein each of the sound emitting devices is associated with at least one individual;

defining a second sound signal based at least in part on the first sound signal using the at least one computer processor; and causing a second plurality of sound signals to be emitted by at least the first sound emitting device, wherein the second plurality of sound signals includes the second sound signal and a third sound signal, wherein the second sound signal is emitted at a sound pressure level consistent with the first weight, and wherein the third sound signal is emitted at a sound pressure level consistent with a second weight.

22. A wearable device comprising:

an apparatus configured for wearing about a head of a user;

at least one speaker provided within a predetermined range of an ear of the user;

a position sensor;

at least one microphone provided on an outer surface of the apparatus; and at least one computer processor in communication with the at least one speaker, the position sensor and the at least one microphone, wherein the at least one computer processor is configured to at least:

determine information regarding the user of the wearable device, wherein the information regarding the user comprises at least one of a position or a velocity of the wearable device determined by the position sensor;

prior to a first time, cause the at least one speaker to emit a first sound signal at a first sound pressure level;

capture acoustic energy using the at least one microphone at a first time, wherein the acoustic energy comprises a first plurality of sound signals;

identify a second sound signal included in the captured acoustic energy, wherein the second sound signal is one of the first plurality of sound signals;

analyze content of the second sound signal included in the captured acoustic energy;

determine at least one of a position or a velocity of a source of the second sound signal based at least in part on at least some of the content of the second sound signal;

determine that the at least some of the content of the second sound signal is relevant to the user based at least in part on:

at least one of the position or the velocity of the wearable device; and at least one of the position or the velocity of the source of the second sound signal;

generate a third sound signal based at least in part on the at least some of the content of the second sound signal;

cause the first sound signal to be emitted by the at least one speaker at a second sound pressure level at a second time, wherein the second time follows the first time, and wherein the second sound pressure level is less than the first sound pressure level; and cause the third sound signal to be emitted by the at least one speaker at a third sound pressure level at or after the second time, wherein the third sound pressure level is greater than the second sound pressure level.

23. The wearable device of claim 22, wherein the at least one computer processor is further configured to at least:

classify the source of the second sound signal based at least in part on the at least some of the content of the second sound signal; and determine that the content of the second sound signal is relevant to the user based at least in part on the classification of the source of the second sound signal.

* * * * *